US008639187B2

(12) United States Patent
Satoh et al.

(10) Patent No.: US 8,639,187 B2
(45) Date of Patent: Jan. 28, 2014

(54) MOBILE COMMUNICATION TERMINAL APPARATUS AND METHOD FOR CONTROLLING SHORT-RANGE WIRELESS COMMUNICATION

(75) Inventors: Hidehiko Satoh, Fukuoka (JP); Yoshiaki Kawakatsu, Fukuoka (JP); Seiji Nomiyama, Fukuoka (JP); Noriaki Taniguchi, Fukuoka (JP); Tatsuya Tanoue, Fukuoka (JP); Toshihiro Iyama, Fukuoka (JP); Hidenobu Nakayama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 12/979,438

(22) Filed: Dec. 28, 2010

(65) Prior Publication Data

US 2011/0183619 A1 Jul. 28, 2011

(30) Foreign Application Priority Data

Jan. 25, 2010 (JP) ................................ 2010-013648

(51) Int. Cl.
*H04B 7/00* (2006.01)

(52) U.S. Cl.
USPC ....... 455/41.3; 455/556.1; 455/557; 455/41.2

(58) Field of Classification Search
USPC .............. 455/90.3, 550.1, 556.1, 41.2, 41.3, 455/575.1, 575.2, 557
See application file for complete search history.

(56) References Cited

U.S. PATENT DOCUMENTS

| 5,615,212 | A * | 3/1997 | Ruszczyk et al. ............ 370/433 |
| 6,826,387 | B1 * | 11/2004 | Kammer ...................... 455/41.2 |
| 7,187,658 | B2 * | 3/2007 | Koyanagi et al. ............. 370/254 |
| 7,809,332 | B1 * | 10/2010 | Kammer ...................... 455/41.2 |
| 7,813,282 | B2 * | 10/2010 | Kim et al. ..................... 370/234 |
| 2002/0044529 | A1 * | 4/2002 | Giroux et al. ................. 370/232 |
| 2004/0185902 | A1 | 9/2004 | Yang |
| 2005/0124381 | A1 | 6/2005 | Kim et al. |
| 2005/0138182 | A1 | 6/2005 | Ryukawa et al. |
| 2006/0194538 | A1 * | 8/2006 | Palin et al. ................... 455/41.2 |
| 2007/0173270 | A1 * | 7/2007 | Block et al. ................... 455/507 |
| 2007/0249332 | A1 * | 10/2007 | Matsuhashi ................ 455/422.1 |
| 2009/0061926 | A1 * | 3/2009 | Lee ............................ 455/556.1 |
| 2010/0062714 | A1 | 3/2010 | Ozaki |
| 2010/0273417 | A1 * | 10/2010 | Tian et al. .................... 455/41.2 |

FOREIGN PATENT DOCUMENTS

| CN | 1615608 A | 5/2005 |
| CN | 1627651 A | 6/2005 |
| JP | 2000-209657 A | 7/2000 |
| JP | 2005-286604 A | 10/2005 |
| JP | 2009-81824 A | 4/2009 |

OTHER PUBLICATIONS

Chinese Office Action dated Nov. 20, 2012, issued in corresponding Chinese patent application No. 201110020172.1, w/ English translation.

* cited by examiner

*Primary Examiner* — Lewis West
(74) *Attorney, Agent, or Firm* — Westerman, Hattori, Daniels & Adrian, LLP

(57) ABSTRACT

A mobile communication terminal apparatus including: a mobile communication terminal main body; and an extension unit detachable from the mobile communication terminal main body and capable of performing short-range wireless communication with the mobile communication terminal main body when being detached in a separated state from the mobile communication terminal main body.

11 Claims, 20 Drawing Sheets

FIG. 6

| SPP | HFP | HID |
|-----|-----|-----|
| 1   | 1   | 1   |

FIG. 9

| COMMUNICATION MODE | SPP | HFP | HID |
|---|---|---|---|
| 1 | 1 | 1 | 1 |

FIG. 10

| No. | STATUS OF MOBILE COMMUNICATION TERMINAL APPARATUS | PROFILE TABLE | COMMUNICATION TABLE | FUNCTION RESTRICTION |
|---|---|---|---|---|
| 1 | 300 COMBINED STATE 400 | SPP HFP HID<br>1 1 1 | 1 | NO RESTRICTION<br>○: TELEPHONE (EARPIECE/SPEAKER)<br>○: KEYBOARD |
| 2 | SEPARATED STATE<br>300<br>400 | SPP HFP HID<br>1 1 1 | 1 | NO RESTRICTION<br>○: TELEPHONE (EARPIECE/SPEAKER)<br>○: KEYBOARD |
| 3 | CAR-NAVI (HFP) CONNECTION<br>300 COMBINED STATE<br>400<br>511<br>DETECTION OF HFP CONNECTION | SPP HFP HID<br>1 0 1 | 1 | RESTRICTION PRESENT (PARTIAL)<br>×: TELEPHONE (EARPIECE/SPEAKER)<br>○: KEYBOARD |
| 4 | CAR-NAVI (HFP) + KEYBOARD (HD) CONNECTION<br>COMBINED STATE<br>511<br>300<br>400<br>512<br>DETECTION OF HID CONNECTION<br>DETECTION OF COMMUNICATION MODE CHANGE NOTE | SPP HFP HID<br>1 0 0 | 0 | RESTRICTION PRESENT (ALL)<br>×: TELEPHONE (EARPIECE/SPEAKER)<br>×: KEYBOARD |

FIG. 11

| No. | STATUS OF MOBILE COMMUNICATION TERMINAL APPARATUS | PROFILE TABLE | COMMUNICATION TABLE | FUNCTION RESTRICTION |
|---|---|---|---|---|
| 1 | CAR-NAVI (HFP) + KEYBOARD (HD) CONNECTION<br><br>COMBINED STATE<br>511<br>300<br>400<br>512 | SPP HFP HID<br>1 0 0 | 0 | RESTRICTION PRESENT (ALL)<br>X: TELEPHONE (EARPIECE/SPEAKER)<br>X: KEYBOARD |
| 2 | DISCONNECTION OF KEYBOARD (HD)<br><br>300<br>511<br>DETECTION OF HID DISCONNECTION | SPP HFP HID<br>1 0 1<br>DETECTION OF COMMUNICATION MODE CHANGE | 1 | RESTRICTION PRESENT (PARTIAL)<br>X: TELEPHONE (EARPIECE/SPEAKER)<br>O: KEYBOARD |
| 3 | DISCONNECTION OF CAR-NAVI (HFP)<br><br>300<br>400<br>DETECTION OF HFP DISCONNECTION | SPP HFP HID<br>1 1 1 | 1 | NO RESTRICTION<br>O: TELEPHONE (EARPIECE/SPEAKER)<br>O: KEYBOARD |
| 4 | ABSENCE  SEPARATED STATE<br>300<br>400 | SPP HFP HID<br>1 1 1 | 1 | NO RESTRICTION<br>O: TELEPHONE (EARPIECE/SPEAKER)<br>O: KEYBOARD |

MOBILE COMMUNICATION TERMINAL APPARATUS AND METHOD FOR CONTROLLING SHORT-RANGE WIRELESS COMMUNICATION

CROSS-REFERENCE TO RELATED APPLICATIONS

This application is related to and claims priority to Japanese Patent Application No. 2010-13648 filed on Jan. 25, 2010 and herein incorporated by reference.

BACKGROUND

1. Field

The present invention relates to a mobile communication terminal apparatus and a method for controlling short-range wireless communication.

2. Description of the Related Art

Heretofore, flip phones and slider phones have become widely used. In recent years, separate phones have been also known in the art. The separate phone is designed so that a structural component, such as a numeric keypad, is detachable from the main body of the phone. Hereinafter, the main body of the separate phone will be referred to as a "main unit" and the structural component to be separated from the main body of the phone will be referred to as an "extension unit".

Among the technologies employed in the separate phones, there is a known technology, such as the Bluetooth (trademark) technology, for establishing a short-range wireless communication between the main unit and the extension unit separated from the main body in addition to a technology for wireless communication between the main unit and the extension unit separated from the main body.

One of such conventional technologies is disclosed in Japanese Unexamined Patent Application Publication No. 2000-209657.

SUMMARY

Embodiments discussed herein are related to a mobile communication terminal apparatus including: a mobile communication terminal main body; and an extension unit detachable from the mobile communication terminal main body and capable of performing short-range wireless communication with the mobile communication terminal main body when being detached in a separated state from the mobile communication terminal main body.

The mobile communication terminal main body includes: a service class management section that manages profile information of whether a plurality of service classes are available for performing short-range wireless communication with the extension unit; and a control unit that controls short-range wireless communication with the extension unit in the separated state on the basis of the availability of each of the plurality of service classes provided by the profile information managed by the service class management section.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWING

FIG. 6 is a diagram illustrating an example of the information stored in the main unit profile table according to the second embodiment;

FIG. 9 is a diagram illustrating an example of the notification message according to the second embodiment;

FIG. 10 is a diagram illustrating an exemplary flow of a setting process performed by the main unit communication mode control section according to the second embodiment;

FIG. 11 is a diagram illustrating an exemplary flow of a setting process performed by the main unit communication mode control section according to the second embodiment;

DETAILED DESCRIPTION OF THE EMBODIMENTS

It has been desired to provide a cell phone with a function to perform short-range wireless communication with any of other various devices. Such a requirement is not only for all-in-one cell phone but also for a separate phone. The main unit of a separate phone may not only perform short-range wireless communication with the extension unit thereof but also may perform short-range wireless communication with any of other various devices if required.

For example, when the main unit of the separate phone performs short-range wireless communication with a car navigation system mounted on a vehicle, the main unit may cut off short-range wireless communication with the extension unit separated therefrom and then establish short-range wireless communication with the car navigation system.

On the other hand, when the main unit of the separate phone ends the short-range wireless communication with the car navigation system, the main unit may establish short-range wireless communication with the extension unit separated therefrom. Conventionally, the break and connection of short-range wireless communication have been performed by operation of the user of the separate phone. Therefore, it leads to an increase in user's operation burden.

When connecting the main unit of the separate phone with another device through short-range wireless communication, it is an important subject how to improve the operability of the main unit.

According to an embodiment, a mobile communication terminal apparatus, which will be disclosed below, includes a mobile communication terminal main body (hereinafter, simply referred to as a main unit) and an extension unit. Here, the extension unit is detachable from the main unit and sends and receives data to and from the main body through short-range wireless communication. Furthermore, the main unit includes a service class management section that manages whether a plurality of service classes is in the state where the extension unit can utilize them. Here, the plurality of service classes is supplied at the time of short-range wireless communication. The main unit also includes a control unit that controls short-range wireless communication with the separated extension unit based on the state where the extension unit is able to utilize a plurality of service classes managed by the service class management section.

First Embodiment

Figure 1:
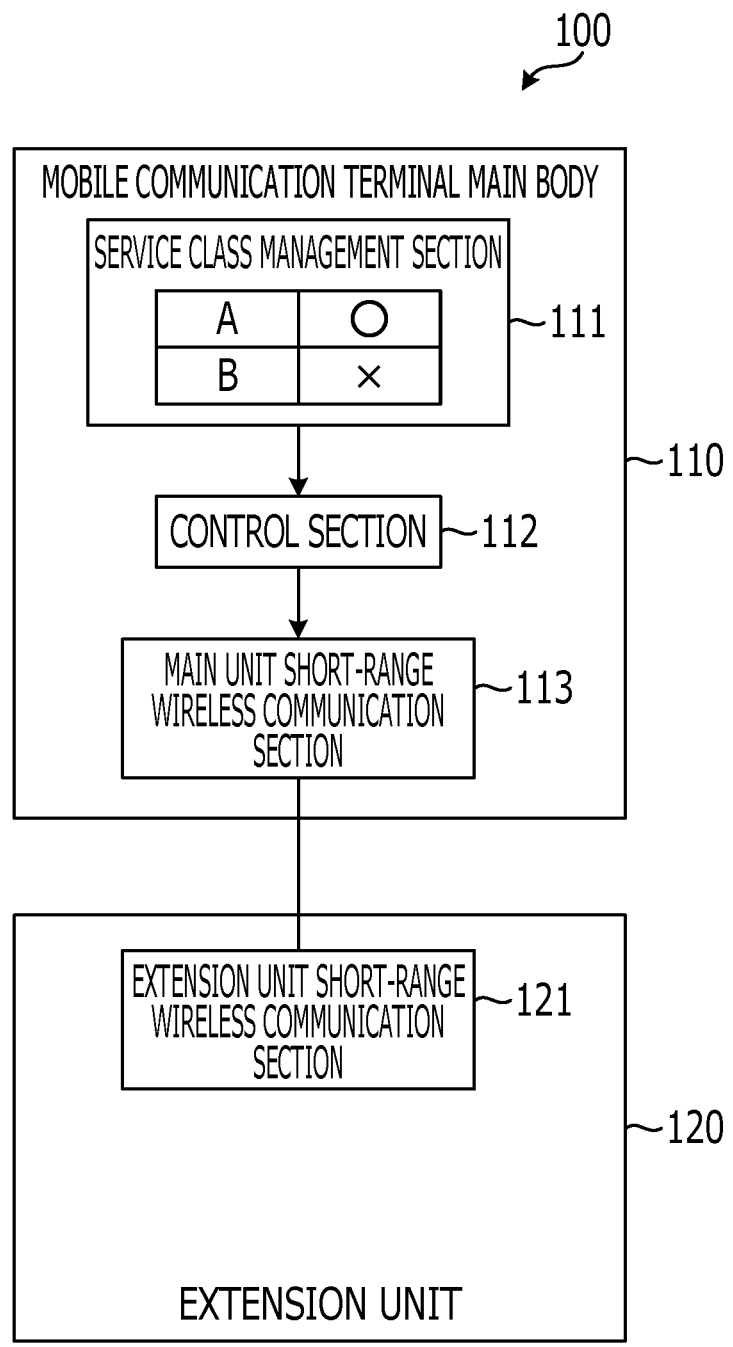
FIG. 1 is a block diagram illustrating an example of the configuration of a mobile communication terminal apparatus according to a first embodiment.

An example of the configuration of a mobile communication terminal apparatus 100 according to a first embodiment will be described. FIG. 1 illustrates the exemplary configuration of the mobile communication terminal apparatus according to the first embodiment. The mobile communication terminal apparatus 100 includes a mobile communication terminal main body (hereinafter, also simply referred to as a main unit) 110. The mobile communication terminal apparatus 100 also includes an extension unit 120 which is detachable from the main unit 110 and performs data reception/transmission from/to the main unit through short-range wireless communication. The mobile communication terminal main body 110 includes a main unit short-range wireless communication section 113 that performs data reception/transmission through shot-range wireless communication. In addition, the extension unit 120 includes an extension unit short-range wireless communication section 121 that performs data reception/transmission through shot-range wireless communication.

The mobile communication terminal main body 110 also includes a service class management section 111 that manages whether a plurality of service classes offered when performing short-range wireless communication with the extension unit is in the state where the extension unit can utilize these service classes. The main unit 110 also includes a control unit 112 that controls short-range wireless communication with the separated extension unit based on the state where the extension unit is able to utilize a plurality of service classes managed by the service class management section 111.

As a result, the mobile communication terminal apparatus 100 can perform short-range wireless communication with the extension unit if there is an empty service class even in the case where the main unit 110 performs short-range wireless communication with any device other than the extension unit 120. For this reason, since the user of the mobile communication terminal apparatus 100 can use the extension unit 120 even if the user is using another device, the operability of the mobile communication terminal apparatus 100 can be improved.

Second Embodiment

[Configuration of mobile communication terminal apparatus] An example of the configuration of a mobile communication terminal apparatus 200 according to a second embodiment will be described. The mobile communication terminal apparatus 200 is a mobile type communication terminal, such as a cellular phone, a personal handy-phone system (PHS), a smart phone, or a personal digital assistant (PDA). The mobile communication terminal apparatus 200 includes a main unit 300, which is a mobile communication terminal main body for communicating with a base station, and an extension unit 400, which is detachably attached to the main unit 300. Hereinafter, the state where the extension unit 400 is separated from the main unit 300 is referred to as a "separated state". The state where the extension unit 400 is attached to the main unit 300 is referred to as a "combined state". Furthermore, the time at which the extension unit 400 is attached to the main unit 300 is referred to as a "time of combination".

The main unit 300 and the extension unit 400 are connected to each other through wire communication when they are in the combined state or through short-range wireless communication when they are in the separated state. Here, the main unit 300 and the extension unit 400 are connected through wire communication or short-range wireless communication is referred to as a "connected state".

Hereinafter, the case where the main unit 300 includes a display and the extension unit 400 includes an operation key pad will be described. However, the present embodiment is not limited to such a case. Alternatively, the main unit 300 and the extension unit 400 may have any different configurations. Here, the present embodiment will be described as one using the Bluetooth (trade mark) as a technology for short-range wireless communication. However, the present embodiment is not limited to such a technology. Alternatively, it may use any technology for short-range wireless communication other than the Bluetooth (trade mark) technology. For example, a short-range wireless communication technology called ZigBee (trade mark), a wireless LAN, or a contactless IC card may be used.

Figure 2:
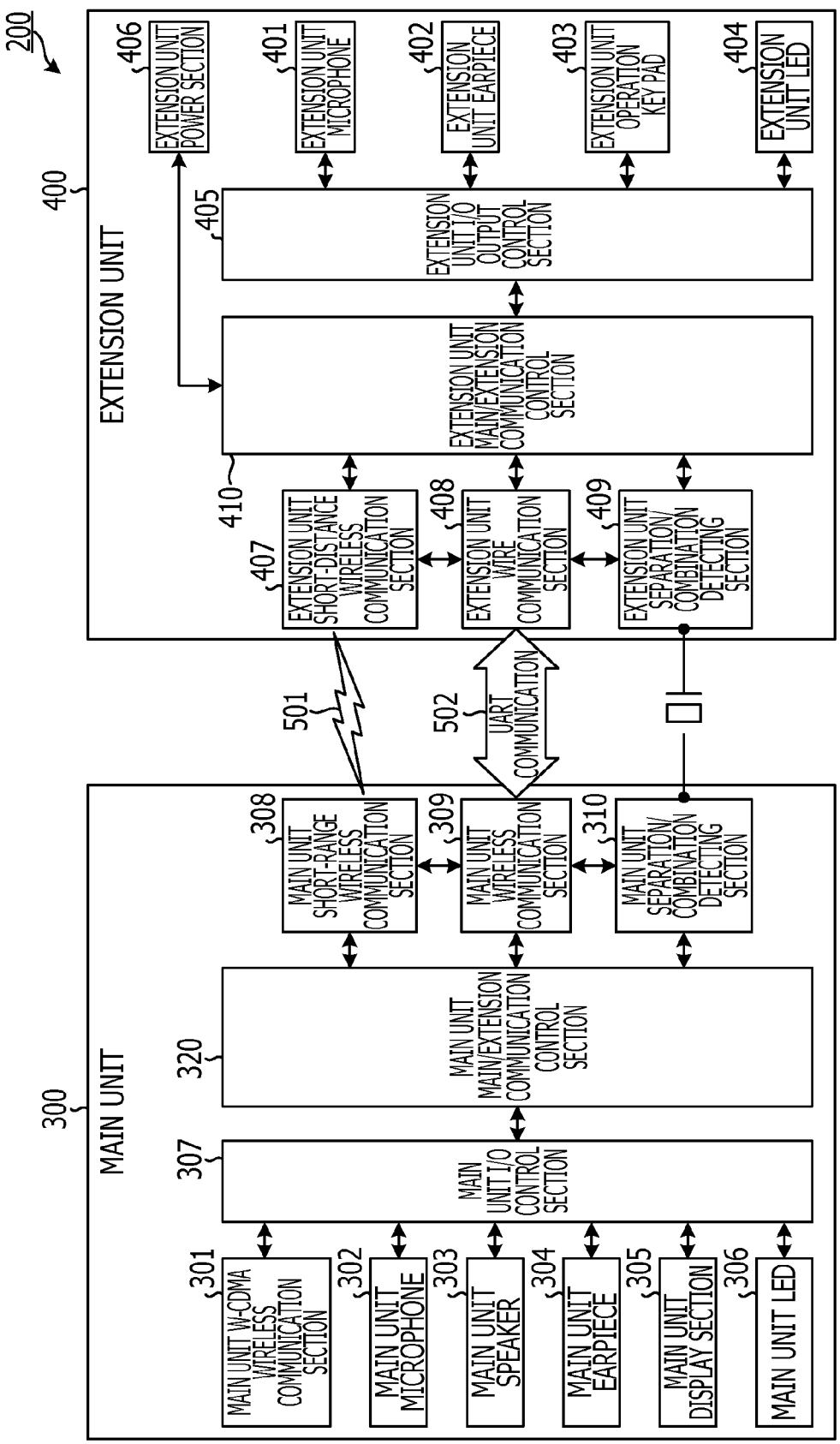
FIG. 2 is a block diagram illustrating an example of the configuration of a mobile communication terminal apparatus according to a second embodiment.

An exemplary configuration of the mobile communication terminal apparatus 200 according to the second embodiment will be described. FIG. 2 is a block diagram illustrating the exemplary configuration of the mobile communication terminal apparatus according to the second embodiment. Hereinafter, features similar to those of the typical mobile communication terminal apparatus will be omitted or briefly described.

[Main unit] Referring now to FIG. 2, the main unit 300 will be described. The main unit 300 includes a main unit wireless communication section 301 based on wide-band code division multiple access (W-CDMA), a main unit microphone 302, a main unit speaker 303, and a main unit earpiece 304. In addition, the main unit 300 also includes a main unit display section 305, a main unit LED (light emitting diode) 306, and a main unit I/O control section 307. The main unit 300 further includes a main unit short-range wireless communication section 308, a main unit wire communication section 309, a main unit separation/combination detecting section 310, and a main unit main/extension communication control section 320.

The main unit W-CDMA wireless communication section 301 connects the mobile communication terminal apparatus 200 to a mobile phone network via a base station (not shown). The main unit microphone 302 collects user's voice. The main unit speaker 303 outputs the voice. For example, if the mobile communication terminal apparatus 200 receives an incoming call, the main unit speaker 303 outputs a ringtone. The main unit earpiece 304 is used while being in contact with the user's ear and outputs the voice sent from the party's mobile communication terminal apparatus or the like. The main unit display unit 305 includes a display for displaying information to the user. The main unit LED 306 displays the state of the mobile communication terminal apparatus 200 by blinking, extinction, or lighting. These structural components, the main unit W-CDMA wireless communication section 301 to the main unit LED 306, are connected to the main unit I/O control section 307, respectively.

The main unit I/O control section 307 is also connected to the main unit main/extension communication control section 320 in addition to connection to each of the main unit W-CDMA wireless communication section 301 to the main unit LED 306. The main unit I/O control section 307 relays the transmission and reception of information between the main unit W-CDMA wireless communication section 301 to the main unit LED 306 and the main unit main/extension communication control section 320.

The main unit short-range wireless communication section 308 is connected to the main unit main/extension communication control section 320. The main unit short-range wireless communication section 308 connects to another device or the extension unit 400 using a short-range wireless communication technology, such as the Bluetooth (trade mark) technology. For example, the main unit short-range wireless communication section 308 connects another device corresponding to short-range wireless communications to the main unit 300 through short-range wireless communication. In addition, for example, the main unit short-range wireless communication section 308 connects the main unit 300 to the extension unit 400 in response to an instruction from the main unit main/extension communication control section 320 through short-range wireless communication. The main unit short-range wireless communication section 308 notifies the main unit main/extension communication control section 320 of the status of connection to another device in response to a request from the main unit main/extension communication control section 320 as described later. For example, the main unit short-range wireless communication section 308 notifies the main unit main/extension communication control section 320 of the number of simultaneous connections, which reflects the number of devices connected to the mobile communication terminal apparatus 200 through short-range wireless communication, the profile of another device connected to the main unit 300, and so on. Here, the profile is also referred to as a service class. In the following description, the phrase "status of connection to another device" will be explained as one representing the status of connection to another device using short-range wireless communications.

The main unit wire communication section 309 is connected to the main unit main wire communication section 309 is connected with main unit main/extension communication control section 320. The main unit wire communication section 309 makes a connection between the main unit 300 and the extension unit 400 in the combined state as represented by reference numeral 502 in FIG. 2. The main wire communication section 309 transmits/receives data to/from a universal asynchronous earpiece transmitter (UART).

The main unit separation/combination detecting section 310 is connected to the main unit main/extension communication control section 320. The main unit separation/combination detecting section 310 detects whether the main unit 300 and the extension unit 400 are in the combined state or a separated state. A technique for detecting whether the main unit 300 and the extension unit 400 are in the combined state or a separated state may be any technique known in the art. For example, the detection of whether the main unit 300 and the extension unit 400 are in the combined state or a separated state may be performed based on the presence or absence of a response to a message that periodically requests a response from the extension unit 400. For example, the main separation/combination detecting section 310 notifies the main unit main/extension communication control section 320 of separation or combination between the main unit 300 and the extension unit 400. In addition, for example, if there is a request from the main unit main/extension communication control section 320, the main separation/combination detecting section 310 notifies the main unit main/extension communication control section 320 of the fact that the main unit 300 and the extension unit 400 are in the separated state or combined state.

The main unit main/extension communication control section 320 is connected to the main unit I/O control section 307, the main unit short-range wireless communication section 308, the main unit wire communication section 309, and main unit separation/combination detecting section 310. The main unit main/extension communication control section 320 includes an internal memory storing programs that define various kinds of procedures to control various kinds of processing. The main unit main/extension communication control section 320 is an electronic circuit, such as an application specific integrated circuit (ASIC), a field programmable gate array (FPGA), a central processing part (CPU), or a micro processing part (MPU).

The main unit main/extension communication control section 320 controls the state of communication between the main unit 300 and the extension unit 400 by cooperation with the extension unit main/extension communication control section 410 as described later. In other words, main unit main/extension communication control section 320 controls whether the main unit 300 and the extension unit 400 perform transmission/reception of information through wire communication or short-range wireless communication. Furthermore, the main unit main/extension communication control section 320 cooperates with the extension unit main/extension communication control section 410 to control the connected state when performing transmission/reception of information through short-range wireless communication.

In other words, as described above, the main unit main/extension communication control section 320 controls whether transmission/reception of information, connection between the main unit 300 and the extension unit 400, or the like is performed using any of profiles. The details of the main unit main/extension communication control section 320 will be described later.

In the following description, the mobile communication terminal apparatus 200 will be exemplified as one which can be simultaneously connected to up to two other devices through near-range wireless communication. If the main unit 300 and the extension unit 400 are in the separated state and connected to each other through near-range wireless communication, the number of simultaneous connections is counted up to "one (1)". In other words, the maximum number of simultaneous connections is "two (2)". Thus, the example will be described as one where the main unit 300 and the extension unit 400 cannot be connected to each other in the separated state when the mobile communication terminal apparatus 200 is connected to two other devices. However, it is noted that the present embodiment is not limited to such an example. The mobile communication terminal apparatus 200 may be one capable of connecting to only one other device at a maximum through the near-range wireless communication or may be one capable of connecting to three or more at a maximum through short-range wireless communication. In the following description, the maximum number of other devices to which the mobile communication terminal apparatus 200 can be connected through short-range wireless communication is also referred to as the "maximum number of simultaneous connections".

[Extension unit] The configuration of the extension unit 400 will be described. The extension unit 400 includes an extension unit microphone 401, an extension unit earpiece 402, an extension unit operation key pad 403, an extension unit LED 404, and an extension unit I/O control section 405. The extension unit 400 also includes an extension unit power section 406, an extension unit short-range wireless communication section 407, an extension unit wire communication section 408, an extension unit separation/combination detecting section 409, and an extension unit main/extension communication control section 410.

These structural components, the extension unit microphone 401 to the extension unit LED 404, connected to the extension unit I/O control section 405, respectively. Here, the functions of the extension unit microphone 401, extension unit earpiece 402, and extension unit LED 404 are similar to those of the main unit microphone 302 and main unit earpiece 304, main unit LED 306, respectively. Thus, their descriptions will be omitted in the following description. The extension unit operation key pad 403 permits the operation of the user and receives an input of information from the user. The extension unit operation key pad 403 may be, for example, a numeric keypad and a keyboard.

The extension unit I/O control section 405 is connected to the extension unit main/extension communication control section 410 as well as the extension unit microphone 401 to the extension unit LED 404. As with the main unit I/O control section 307, the extension I/O control section 405 controls transmission/reception of information between the extension unit microphone 401 to the extension unit LED 404 and the extension main/extension communication control section 410. The extension unit power section 406 is connected to the extension unit main/extension communication control section 410. The extension unit power section 406 controls a process of turning on/off the power of the extension unit 400.

The extension unit main/extension communication control unit 410 is connected to each of the extension unit short-range wireless communication section 407, the extension unit wire communication section 408, and the extension unit separation/combination detecting section 409. The descriptions of the extension unit short-range wireless communication section 407, extension unit wire communication section 408, and extension unit separation/combination detecting section 409 will be omitted in the following description because they correspond to the main unit short-range wireless communication section 308, main unit wire communication section 309, main unit separation/combination detecting section 310, respectively.

The extension unit main/extension communication control unit 410 is connected to each of the extension unit I/O control section 405, the extension unit power section 406, the extension unit short-range wireless communication section 407, the extension unit wire communication section 408, and the extension unit separation/combination detecting section 409. The extension unit main/extension communication control section 410 includes an internal memory storing programs that define various kinds of procedures to control various kinds of processing. The extension unit main/extension communication control section 410 is an electronic circuit, such as ASIC, FPGA, CPU, or MPU. The extension unit main/extension communication control section 410 controls the state of communication between the main unit 300 and the extension unit 400 by cooperation with the main unit main/extension communication control section 320 as described later. The details of the extension unit main/extension communication control section 410 are omitted in this section because they will be described later.

[Utilization Form of a Mobile Communication Terminal Apparatus]

The utilization form of the mobile communication terminal apparatus 200 by the user will be described briefly. For example, the mobile communication terminal apparatus 200 in the combined state is used such that the main unit earpiece 304 is placed against the user's ear and the main unit microphone 302 collects the user's voice. In other words, the user can hear the voice from the party's mobile communication terminal apparatus by placing the user's ear against the main unit earpiece 304 while speaking into the main unit microphone 302 to send the user's voice to the party's mobile communication terminal apparatus.

In addition, the mobile communication terminal apparatus 200 in the separated state used such that the extension unit earpiece 402 is placed against the user's ear and the extension unit microphone 401 collects the user's voice. In other words, the user can hear the voice from the party's mobile communication terminal apparatus by placing the user's ear against the extension unit earpiece 402 while speaking into the extension unit microphone 401 to send the user's voice to the party's mobile communication terminal apparatus. Furthermore, the user acquires information using the main unit 300. That is, the user displays the information on the display of the main unit 300 and then acquires the information. Therefore, in the separated state, for example, the use can use the main unit with the display and the extension unit with the operation key pad or the like separately. This utilization form can be useful in the case where the user make a video-phone call using a cell phone.

Here, the mobile communication terminal apparatus 200 in the separated state is used such that the main unit earpiece 300 is placed against the user's ear and the main unit microphone 302 collects the user's voice.

In the following description, the short-range wireless communications will be exemplified as those using profiles, a serial port profile (SPP), a hands free profile (HFP), and a human interface device (HID). The SPP is used for transmission and reception of control signals. For example, the SPP is used for transmission and reception of an informative message which will be described later.

The HFP is used for transmission and reception of audio signals. For example, the HFP is used for connecting the mobile communication terminal apparatus 200 to an earphone, a speaker, or a car navigation system. In other words, the main unit 300 and the extension unit 400 are connected to each other using the HFP to allow the user to utilize the function of the extension unit 400 as a telephone. The HID is used for transmission and reception of information about the operation content of the operation key pad. For example, the HID is used for connecting the main unit 300 to a keyboard. In other words, the connection between the main unit 300 and the extension unit 400 using the HID allows the user to uses the operation key pad of the extension unit 400 in the separated state.

Hereinafter, the example where "SPP", "HFP", and "HID" are used will be described. However, the present embodiment is not limited to such an example. For example, profiles other than "SPP", "HFP", and "HID" may be further used. Alternatively, any of "SPP", "HFP", and "HID" may be not used or any arbitrary profile may be used.

Here, for example, the case where the mobile communication terminal apparatus 200 cannot be connected to two or more other devices using the same profile will be described. For example, the case where the mobile communication terminal apparatus 200 cannot be connected to any of other devices when being connected to a car navigation system 511 using the "HFP" will be described. However, the present invention is not limited to such an example. Alternatively, the same profile may be used for connecting the mobile communication terminal apparatus 200 to two or more other devices.

[Table of Main Unit Main/Extension Communication Control Section]

Figure 3:
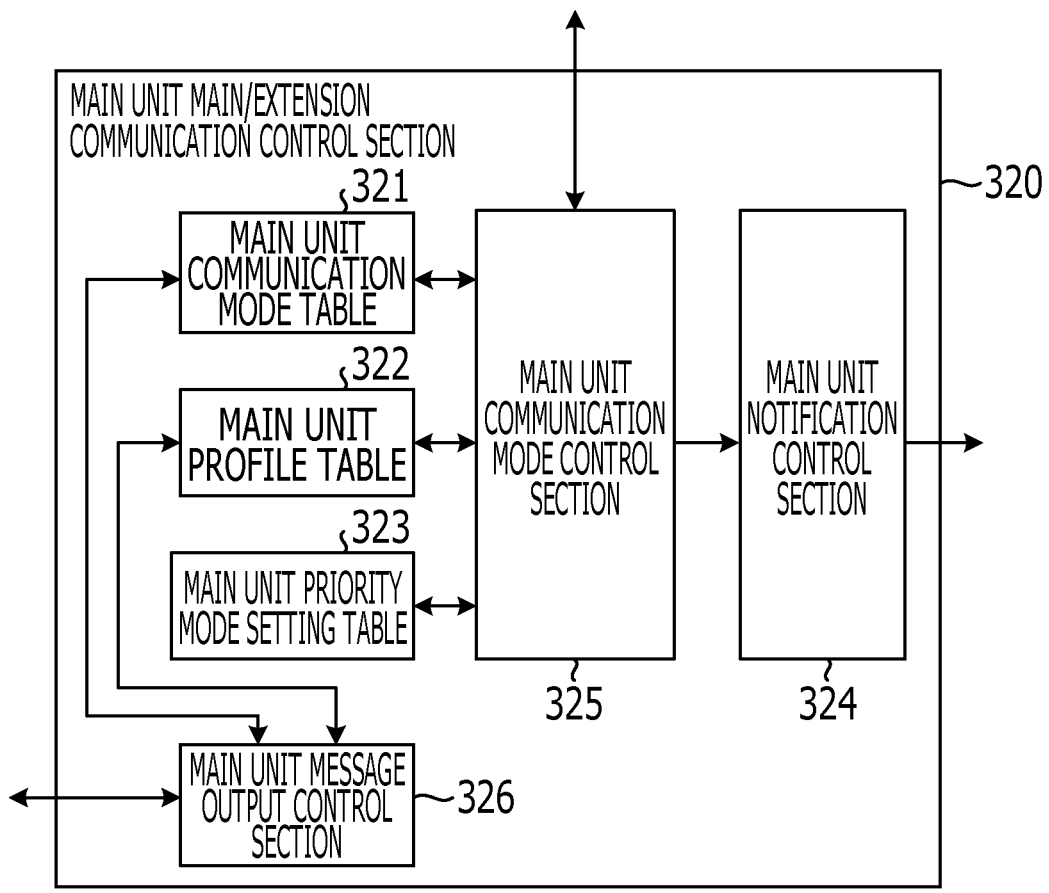
FIG. 3 is a block diagram illustrating an example of the configuration of a main unit-side control section for controlling communication between a main unit and an extension unit according to the second embodiment.
Figure 4:
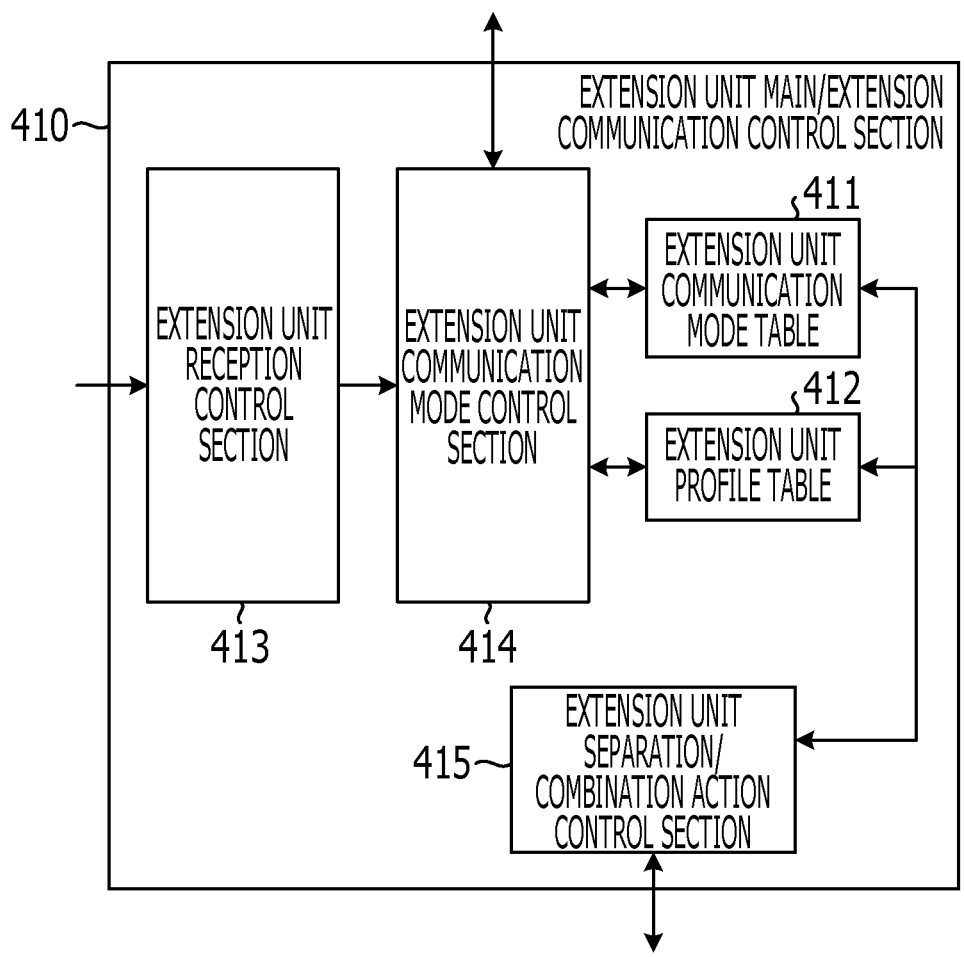
FIG. 4 is a block diagram illustrating an example of the configuration of an extension unit main/extension communication control section according to the second embodiment.

Using FIG. 3 and FIG. 4, the main unit main/extension communication control section 320 and the extension unit main/extension communication control section 410 will be described in detail. FIG. 3 is a block diagram illustrating an exemplary configuration of the main unit main/extension communication control section according to the second embodiment. FIG. 4 is a block diagram illustrating an exemplary configuration of the extension unit main/extension communication control section according to the second embodiment. As illustrated in FIG. 3, the main unit main/extension communication control section 320 includes a main unit communication mode table 321, a main unit profile table 322, and a main unit priority mode setting table 323.

Furthermore, the main unit main/extension communication control section 320 includes a main unit notification control section 324, a main unit communication control section 325, and a main unit message output control section 326 as a processing part, which serve as processing sections. Furthermore, as shown in FIG. 4, the extension unit main/extension communication control section 410 includes an extension unit communication mode table 411 and an extension unit profile table 412. In addition, the extension unit main/extension communication control section 410 includes an extension unit reception control section 413, an extension unit communication mode control section 414, and an extension unit separation/combination action control section 415, which serve as processing sections.

In the following description, first, the table of the main unit main/extension communication control section 320 and the table of the extension unit main/extension communication control section 410 will be described. Then, the main unit main/extension communication control section 320 as a processing part and the extension unit main/extension communication control section 410 as a processing part will be described. Each table can be realized using a non-volatile memory, such as a flash memory, mounted on the mobile communication terminal apparatus 200. The use of the non-volatile memory intends to prevent data from disappearing by turning on/off the power.

The table of the main unit main/extension communication control section 320 will be described.

The main unit communication mode table 321 stores a communication mode that indicates whether the main unit 300 is able to use the extension unit 400 in the separated state. In other words, the main unit communication mode table 321 stores whether the extension unit can be used in the separated state. For example, the main unit communication mode table 321 stores an "extension unit available communication mode" representing that the extension unit can be used in the separated state or an "extension unit unavailable communication mode" representing that the extension unit cannot be used in the separated state.

The "extension unit available communication mode" indicates that the main unit 300 and the extension unit 400 are connectable to each other through short-range wireless communication. The "extension unit unavailable communication mode" indicates that the main unit 300 and the extension unit 400 are not connectable to each other through short-range wireless communication.

As described later, the communication mode stored in the main unit communication mode table 321 is set by the main unit communication mode control section 325 based on information stored in each of the main unit profile table 322 and the main unit priority mode setting table 323. In an initial state, furthermore, it is considered that there is no other device connected to the mobile communication terminal apparatus 200 through short-range wireless communication. The main unit communication mode table 321 stores a communication mode, "extension unit available communication mode".

Figure 5A:
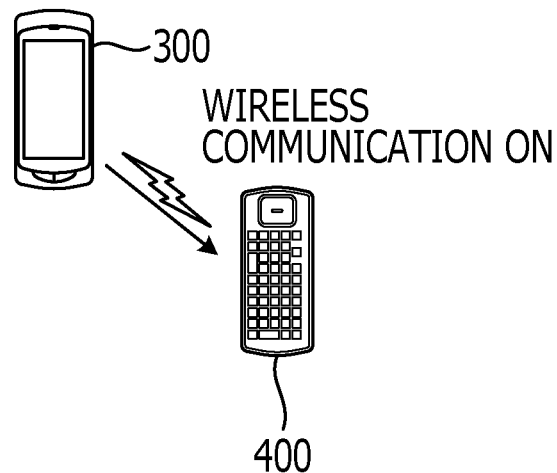
FIG. 5A is a diagram illustrating an example in which the communication mode is switched to the extension unit available communication mode according to the second embodiment.
Figure 5B:
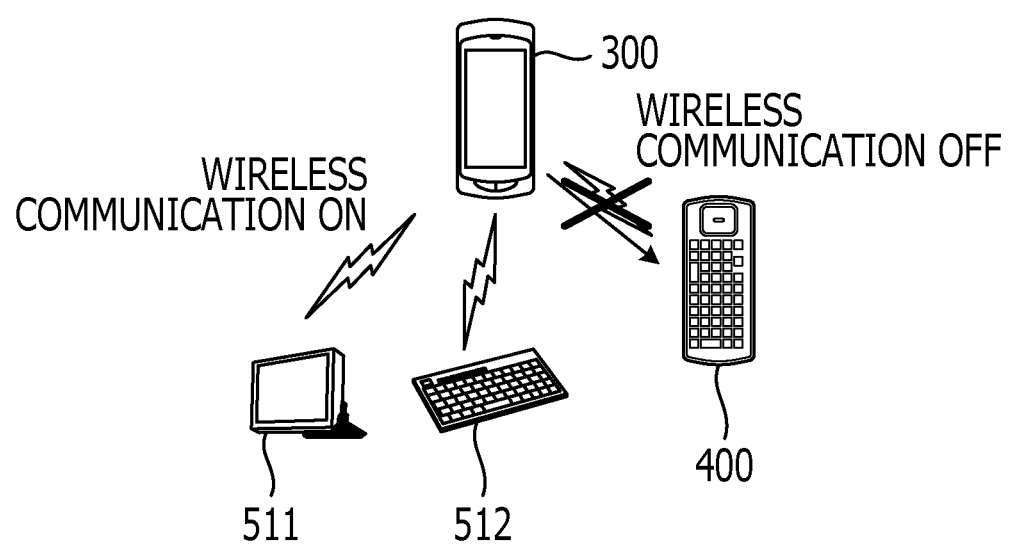
FIG. 5B is a diagram illustrating an example in which the communication mode is switched to the extension unit unavailable communication mode according to the second embodiment.

Referring now to FIG. 5A and FIG. 5B, the communication mode according to the second embodiment will be described. FIG. 5A is a diagram illustrating an example in which the communication mode is switched to the extension unit available communication mode according to the second embodiment. FIG. 5B is a diagram illustrating an example in which the communication mode is switched to the extension unit unavailable communication mode according to the second embodiment. As illustrated in FIG. 5A, for example, if the main unit 300 is not connected to another device, the main unit 300 and the extension unit 400 can be connected to each other through short-range wireless communication. In this case, the main unit communication mode table 321 stores the extension unit available communication mode. On the other hand, for example, if the main unit 300 is connected to a car navigation system 511 and a keyboard 412 as illustrated in FIG. 5B, the main unit 300 and the extension unit 400 cannot be connected to each other because of connection to other devices of the maximum number of simultaneous connections. In this case, the main unit communication mode table 321 stores the communication mode, "extension unit available communication mode".

The main unit profile table 322 stores whether plural service classes, which can be supplied when the main unit 300 performs short-range wireless communication with the extension unit 400, are available to the extension unit 400. For example, for each of profiles to be used when the main unit 300 and the extension unit 400 are connected to each other through short-range wireless communication, the main unit profile table 322 stores utilization information that represents whether such a profile is available. Hereinafter, the profile to be used when the main unit 300 and the extension unit 400 are connected to each other through short-range wireless communication is also referred to as an "extension unit available profile". In other words, the main unit profile table 322 stores the utilization information about the extension unit available profile.

Figure 6:
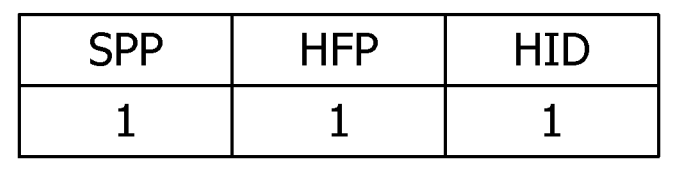

Referring now to FIG. 6, an example of the information stored in the main unit profile table 322 according to the second embodiment will be described. FIG. 6 is a diagram illustrating an example of the information stored in the main unit profile table according to the second embodiment. As illustrated in FIG. 6, the main unit profile table 322 stores utilization information about each of SPP, HFP, and HID. In the example illustrated in FIG. 6, "1 (one)" indicates that the profile is available and "0 (zero)" indicates that the profile is unavailable.

In the example illustrated in FIG. 6, the main unit profile table 322 stores SPP "1", HFP "1", and HID "1". In other words, the main unit profile table 322 stores that each of the SPP, HFP, and HID is available when the main unit 300 and the extension unit 400 are connected to each other through short-range wireless communication.

The information stored in the main unit profile table 322 is set by the main unit communication mode control section 325 based on the status of connection to another device and the main unit priority mode setting table 323. For example, if the mobile communication terminal apparatus 200 is not connected to any of other devices through short-range wireless communication, all profiles when the main unit 300 and the extension unit 400 are connected to each other through short-range wireless communication become available. In this case, in the main unit profile table 322, both the SPP and the HID are set to "1" by the main unit communication mode control section 325, respectively.

Here, if a priority mode described later is not set in the main unit priority mode setting table 323, the main unit profile table 322 is updated every time the status of connection between the mobile communication terminal apparatus 200 and another device is changed as described later. In the main unit profile table 322, on the other hand, if a priority mode is set in the main unit priority mode setting table 323, all the extension available profiles are set to "1", regardless of the status of connection to another device.

The main unit priority mode setting table 323 stores whether the connection between the main unit 300 and the extension unit 400 has priority to the connection between the main unit 300 and another device. For example, the main unit priority mode setting table 323 stores the "priority mode" that represents a configuration where the connection between the main unit 300 and the extension unit 400 through short-range wireless communication comes fast or the "non priority mode" that represents a configuration where the connection between the main unit 300 and the extension unit 400 through short-range wireless communication is not preferential. In the non priority mode, it is considered that the connection between the main unit 300 and the extension unit 400 is equal to the connection between the main unit 300 and another device.

Figure 7:
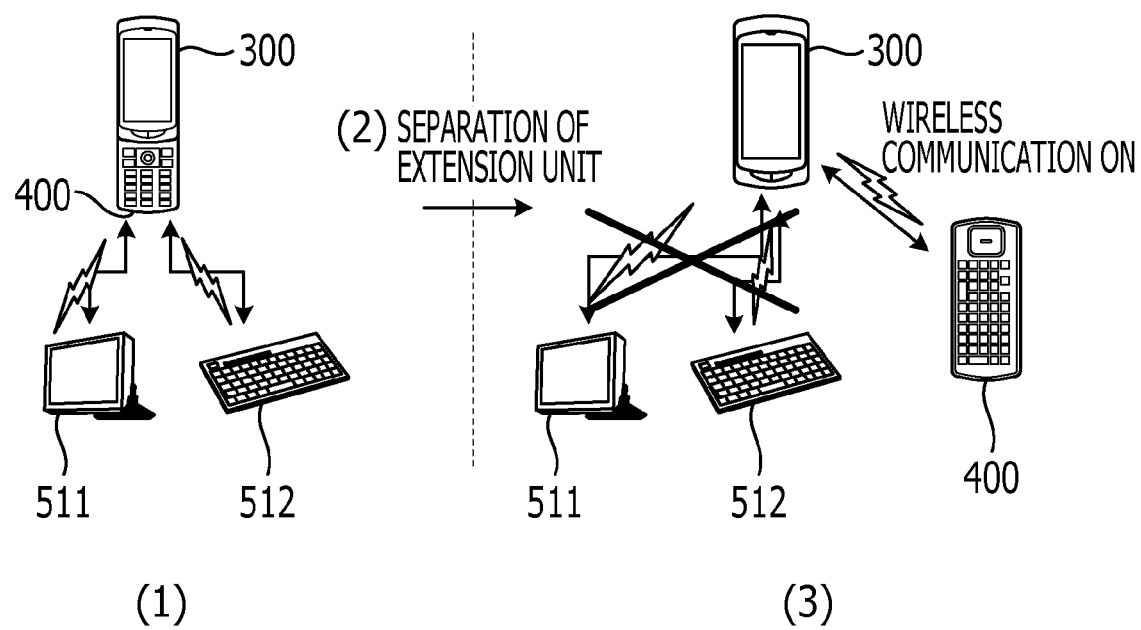
FIG. 7 is a diagram illustrating the priority mode according to the second embodiment.

The priority mode will be described with reference to FIG. 7. Here, FIG. 7 is a diagram illustrating the priority mode according to the second embodiment. First, as illustrated in (1) of FIG. 7, it is considered that the mobile communication terminal apparatus 200 is connected to the car navigation system 511 and the keyboard 512 in the combined state through short-range wireless communication. In this case, the main unit 300 and the extension unit 400 are not connected to each other through short-range wireless communication.

Next, as illustrated in (2) of FIG. 7, it is considered that the extension device 400 is detached from the main unit 300 while short-range wireless communication with another device is being established. As illustrated in (3) of FIG. 7, the mobile communication terminal apparatus 200 controls the main unit 300 so that the short-range wireless communication between the main unit 300 and another device is stopped and short-range wireless communication between the main unit 300 and the extension unit 400 is then established. In the priority mode according to the second embodiment, the main unit 300 of the mobile communication terminal apparatus 200 is connected to the extension unit 400 with higher priority than any of other devices as a connection target of short-range wireless communication.

The configuration stored in the main unit priority mode setting table 323 is set by the user. For example, the mobile communication terminal apparatus 200 provides the user with a user interface in which the user is allowed to select a mode from the priority mode and the non priority mode. Then, the mode selected by the user is set in the main unit priority mode setting table 323.

Figure 8:
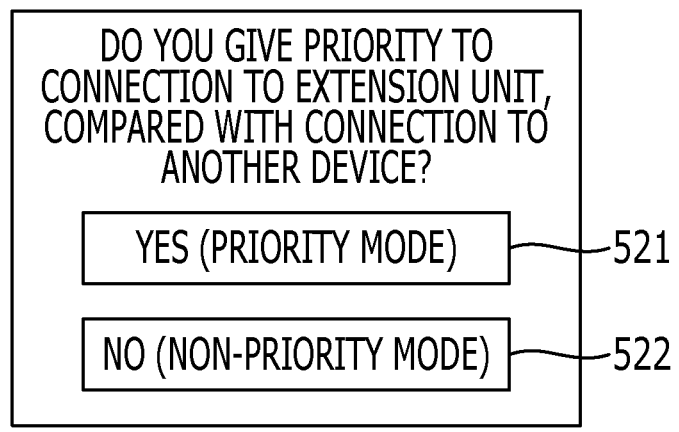
FIG. 8 illustrates an example of the user interface for selecting the priority mode according to the second example.

FIG. 8 illustrates an example of the user interface for selecting the priority mode according to the second example. In FIG. 8, reference numeral 521 denotes a field for receiving the configuration of the priority mode and reference numeral 522 denotes a field for receiving the configuration of the non priority mode. The mobile communication terminal apparatus 200 displays a screen, such as one illustrated in FIG. 8, on the display. Subsequently, for example, if the user selects the field 521, the mobile communication terminal apparatus 200 sets the priority mode in the main unit priority mode setting table 323. Alternatively, for example, if the user selects the field 522, the mobile communication terminal apparatus 200 sets the non priority mode in the main unit priority mode setting table 323.

[Table of extension unit main/extension communication control section] Next, the table of the extension unit main/extension communication control section 410 will be described.

The extension unit communication mode table 411 stores a communicate mode just as in the case with the main unit communication mode table 321. As described later, in the extension unit communication mode table 411, the extension unit communication mode control section 414 sets a communication mode sent from the main unit 300 to the extension unit 400. In other words, in the connected state, the extension unit communication mode table 411 is synchronized with the main unit communication mode table 321.

The extension unit profile table 412 stores the utilization information about the extension unit available profile just as in the case with the main unit available profile table 322. As described later, in the extension unit profile table 412, the extension unit communication mode control section 414 sets an extension available profile sent from the main unit 300 to the extension unit 400.

That is, the extension unit profile table 412 synchronizes with the main unit profile table 322 in the connected state.

[Processing section of main unit main/extension communication control section] The processing part of the main unit main/extension communication control section 320 will be described. The main unit notification control section 324 transmits a notification message to the extension unit 400, where the notification message is provided for notifying the information stored in each of the main unit communication mode table 321 and the main unit profile table 322. For example, the main unit notification control section 324 transmits a notification message to the extension unit 400 every time each of the main unit communication mode table 321 and the main unit profile table 322 is updated by the main unit communication mode control section 325.

Figure 9:
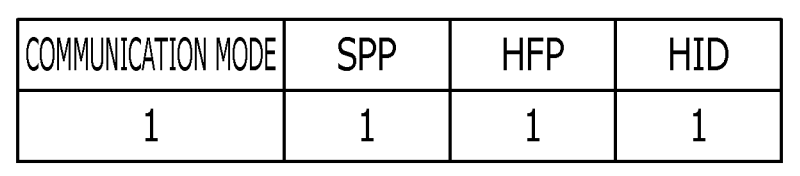

Referring now to FIG. 9, an example of the notification message according to the second embodiment will be described. FIG. 9 is a diagram illustrating an example of the notification message according to the second embodiment. As illustrated in FIG. 9, the main unit notification control section 324 is designed to transmit a communication mode and utilization information about each of extension unit available profiles. In the example illustrated in FIG. 9, the main unit notification control section 324 transmits a notification message that includes the communication mode "1", SSP "1", HFP "1", and HID "1". In other words, in the example illustrated in FIG. 9, the main unit notification control section 324 transmits the notification message notifying that the communication mode is an "extension unit available communication mode" and each of SPP, HFP, and HID is available. In the example illustrated in FIG. 9, the communicate mode "1" represents an extension unit available communication mode.

In the connected state, the main unit notification control section 324 preferentially transmits a notification message to the extension unit 400 using the main unit wire communication section 309. In the separated state, the main unit notification control section 324 transmits a notification message to the extension unit 400 using the main unit short-range wireless communication section 308 through short-range wireless communication. For example, the main unit notification control section 324 performs transmission of a notification message using SPP among the extension unit available profiles when the notification message is sent to the extension unit 400 through short-range wireless communication. Subsequently, as described later, the extension unit communication mode control unit 414 updates each of the extension unit communication mode table 411 and the extension unit profile table 412. In other words, in the connected state, the main unit communication mode table 321 is synchronized with the extension unit communication mode table 411, while the main unit profile table 322 is synchronized with the extension unit profile table 412.

The main unit communication mode control section 325 manages whether the extension available profiles are available to the extension unit 400. For example, as described later, the main unit communication mode control section 325 executes a process for setting the utilization information of the main unit profile table 322 and a process for setting the communication mode of the main unit communication mode table 321.

The process for setting the utilization information of the main unit profile table 322 will be described. The main unit communication mode control section 325 sets up the main unit profile table 322 based on the status of connection to another device and the main unit priority mode setting table 323. Furthermore, the main unit communication mode control section 325 updates the main unit profile table 322 every time the status of connection to another device and the main unit priority mode setting table 323 are changed. In other words, the main unit communication mode control section 325 updates the available state of the extension unit available profiles when the short-range wireless communication with another device is completed.

For example, the main unit communication mode control section 325 sets up the utilization information "1" with respect to all of the extension available profiles regardless of the status of connection to another device when the priority mode is set in the main unit priority mode setting table 323. In other words, the main unit communication mode control section 325 sets the utilization information "1", which indicates "available", to all of the extension unit available profiles.

For example, the main unit communication mode control section 325 sets up the main unit profile table 322 based on the status of connection to another device, when the non priority mode is set in the main unit priority mode setting table 323. For example, the main unit communication mode control section 325 acquires the status of connection to another device from the main unit short-range wireless communication section 308 to determine whether each of the extension unit available profile is occupied by connection to another device. Then, the main unit communication mode control section 325 sets the utilization information "0", which indicates "unavailable", to all of the extension unit available profiles determined as being occupied. In addition, the main unit communication mode control section 325 sets the utilization information "1", which indicates "available", to all of the extension unit available profiles determined as being not occupied.

Here, the process for setting the communication mode of the main unit communication mode table 321 will be described. The main unit communication mode control section 325 sets up the main unit communication mode table 321 based on the main unit profile table 322, the number of simultaneous connections, and the main unit priority mode setting table 323. Furthermore, the main unit communication mode control section 325 updates the main unit communication mode table 321 every time the status of connection to main unit profile table 322 or the main unit priority mode setting table 323 is changed.

For example, main unit communication mode control section 325 sets up the communication mode "1", which indicates the extension unit available communication mode, in the main unit communication mode table 321 when the priority mode is set in the main unit priority mode setting table 323. That is, the main unit communication mode control section 325 sets up a fact that the extension node 400 is available in the separated state.

Furthermore, for example, the main unit communication mode control section 325 sets up the main unit communication mode table 321 based on the number of simultaneous connections and the main unit profile table 322 when the non priority mode is set in the main unit priority mode setting table 323.

For example, the main unit communication mode control section 325 sets the extension unit unavailable communication mode in the main unit communication mode table 321 when the number of simultaneous connections is the maximum number of simultaneous connections. If the maximum number of simultaneous connections is "2", for example, the number of simultaneous connections reaches the maximum thereof in the state where the mobile communication terminal apparatus 200 is connected to the car navigation system 511 and the keyboard 512. In this case, the main unit communication mode control section 325 cannot establish connection to the extension unit 400 in the separated state unless at least the connection to the car navigation system 511 or the keyboard 512 is canceled. Thus, the mobile communication terminal apparatus 200 in the separated state sets a fact that the extension unit 400 is unavailable in the main unit communication mode table 321.

For example, the main unit communication mode control section 325 will be described in the case where the number of simultaneous connections does not reach the number of the maximum simultaneous connections. In this case, the main unit communication mode control section 325 sets the communication mode, "extension unit unavailable communication mode", in the main unit communication mode table 321 when a predetermined profile among the profiles stored in the main unit profile table 322 is unavailable.

On the other hand, the main unit communication mode control section 325 sets the communication mode "1" in the main unit communication mode table 321 when the predetermined profile among the profiles stored in the main unit profile table 322 is available. Here, for example, the communication mode "0" will be described as one that represents the extension unit unavailable communication mode.

That is, even in the state where the mobile communication terminal apparatus 200 is not connected to other devices corresponding to the maximum number of simultaneous connections, the main unit 300 and the extension unit 400 cannot be connected to each other through short-range wireless communication as long as the extension unit available profile is unavailable. Based on this fact, the main unit communication mode control section 325 sets the communication mode "extension unit unavailable communication mode" when it cannot use a predetermined profile among the extension unit available profiles, or the communication mode "1" when it can use the predetermined profile.

By way of illustration, description will be made for the case where the communication mode is set to "extension unit unavailable communication mode" when HFP and HID are unavailable. However, the present invention is not limited to such an example. Any profile among the profiles stored in the main unit profile table 322 may be set as such a predetermined profile. For example, all of SPP, HFP, and HID may be set as predetermined profiles or one of SPP, HFP, and HID may be set as a predetermined profile.

Here, referring now to FIG. 10 and FIG. 11, a process for setting up the main unit profile table 322 and the main unit communication mode table 321 will be described. FIG. 10 is a diagram illustrating an example in which the communication mode is changed from "1" to "0". FIG. 11 is a diagram illustrating an example in which the communication mode is changed from "0" to "1". In each of FIG. 10 and FIG. 11, the item name "state of mobile communication terminal apparatus" represents that the mobile communication terminal apparatus 200 is in the separated state or the combined state. In other words, it indicates the state of connection to another device. The item name "profile table" represents the unit profile table 322. The item name "communication mode table" represents the main unit communication mode table 321. The item name "function restriction" represents examples of functions which can be or cannot be used by the separated state.

FIG. 10 is a diagram illustrating an exemplary flow of a setting process performed by the main unit communication mode control section according to the second embodiment. In FIG. 10, the first column (No. "1") represents the combined state of the mobile communication terminal apparatus 200, where it is not connected to any of other devices. In this case, the main unit profile table 322 stores SPP "1", HFP "1", and HID "1", and the main unit communication mode table 321 stores communication mode "1". Therefore, No. "1" in FIG. 10 represents that the phone function and the keyboard of the extension unit 400 are available in the separated state.

As illustrated in the second column (No. "2") in FIG. 10, it is considered that the main unit 300 and the extension unit 400 are detached from each other after the state of No. "1" in FIG. 10. In this case, since the mobile communication terminal apparatus 200 is not connected to any of other devices, the main unit profile table 322 stores SPP "1", HFP "1", and HID "1", and the main unit communication mode table 321 stores communication mode "1" just as in the case with No. "1" in FIG. 10. Therefore, No. "2" in FIG. 10 represents that the phone function and the keyboard of the extension unit 400 are available in the separated state.

As illustrated in the third column (No. "3") in FIG. 10, it is considered that, after No. "2" in FIG. 10, the main unit 300 is combined with the extension unit 400 and then connected to the car navigation system 511. In this case, HFP is occupied as a result of connection between the main unit 300 and the car navigation system 511 using HFP. Thus, the HFP of the main unit profile table 322 is updated from "1" to "0". Therefore, No. "3" in FIG. 10 represents that the phone function of the extension unit 400 is unavailable but the keyboard of the extension unit 400 is available in the separated state.

As illustrated in the fourth column (No. "4") in FIG. 10, it is considered that, after No. "3" in FIG. 10, the main unit 300 is connected to the keyboard 512 in addition to the connection to the car navigation system 511. In other words, the main unit 300 and the car navigation system 511 are connected to each other using the HFP, while the main unit 300 and the keyboard 512 are connected to each other using the HID. As a result, in addition to the HFP, the HID is occupied. Thus, the HID is updated from "1" to "0" in the main unit profile table 322. Furthermore, since both the HFP and the HID are changed to "0", the communication mode of the main unit communication mode table 321 is updated from "1" to "0". Therefore, No. "4" in FIG. 10 represents that the extension unit 400 is unavailable in the separated state.

As illustrated in Nos. "1" and "2" in FIG. 10, there is no change in both the main unit profile table 322 and the main unit communication mode table 321 even if the state of the mobile communication terminal apparatus 200 is changed from the combined state to the separated state. On the other hand, as illustrated in Nos. "3" and "4" in FIG. 10, if the main unit 300 is connected to another device using the profile used for the connection between the main unit 300 and the extension unit 400, the main unit profile table 322 and the main unit communication mode table 321 are updated.

FIG. 11 is a diagram illustrating an exemplary flow of a setting process performed by the main unit communication mode control section according to the second embodiment. In FIG. 11, the first column (No. "1") represents the combined state of the mobile communication terminal apparatus 200. In this case, the main unit 300 is connected to the car navigation system 511 using HFP and also connected to the keyboard 512 using HID. In this case, as with No. "4" in FIG. 10, the main unit profile table 322 stores SPP "1", HFP "0", and HID "0", and the main unit communication mode table 321 stores communication mode "0". Therefore, No. "1" in FIG. 11 represents that the extension unit 400 is unavailable in the separated state.

As illustrated in the second column (No. "2") in FIG. 11, it is considered that the keyboard 512 is disconnected after No. "1" in FIG. 11. In this case, as a result of connection of the main unit 300 and the keyboard 512 using the HID, the HID of the main unit profile table 322 is updated from "0" to "1". Furthermore, since one of the HFP and the HID is changed to "1", the communication mode of the main unit communication mode table 321 is updated from "0" to "1". Therefore, No. "2" in FIG. 11 represents that the phone function of the extension unit 400 is unavailable but the keyboard of the extension unit 400 is available in the separated state.

As illustrated in the third column (No. "3") in FIG. 11, it is considered that the car navigation system 511 is disconnected after No. "2" in FIG. 11. In this case, HFP is freed as a result of connection between the main unit 300 and the car navigation system 511 using HFP. Thus, the HFP of the main unit profile table 322 is updated from "0" to "1". Therefore, No.

"3" in FIG. 11 represents that the phone function of the extension unit 400 is available in the separated state and also the keyboard of the extension unit 400 is available in the separated state.

As illustrated in the second column (No. "4") in FIG. 11, it is considered that the main unit 300 and the extension unit 400 are detached from each other after the state of No. "3" in FIG. 11. In this case, the main unit profile table 322 and the main unit communication mode table 321 are not updated. Therefore, No. "4" in FIG. 11 represents that the phone function of the extension unit 400 is available and the keyboard of the extension unit 400 is available in the separated state.

In addition, when the extension unit 400 is separated, the main unit communication mode control section 325 controls the short-range wireless communication between the main unit 300 and the extension unit 400 in the separated state based on the available state of the extension unit available profile. In addition, the main unit communication mode control section 325 responds to the update of the available state of the extension unit available profile and then updates the service class supplied to the extension unit 400.

The main unit communication mode control section 325 does not establish the short-range wireless communication between the main unit 300 and the extension unit 400 in the separated state when a predetermined extension unit available profile is not in an available state. In the priority mode, when the extension unit 400 is in the separated state where the extension unit 400 is detached from the main unit 300 while the main unit 300 is in a state of establishing short-range wireless communication with another device, the main unit communication mode control section 325 turns off the short-range wireless communication with another device and then establishes short-range wireless communication with the extension unit 400.

Hereinafter, the process for controlling the communication mode performed by the main unit communication mode control unit 325 will be described by dividing such a controlling process into two different processes, a controlling process in the separated state and a start-up process at the time of turning on the power of the main unit 300. If the priority mode is set in the main unit priority mode setting table 323, the main unit communication mode control section 325 executes a process corresponding to the priority mode. That is, the main unit communication mode control section 325 cancels the connection between the main unit 300 and another device which has been connected using the extension unit available profile. In other words, the main unit communication mode control section 325 disconnects another device using the profile for which the extension unit simultaneously contends. Subsequently, the main unit communication mode control section 325 controls so that the main unit 300 and the extension unit 400 are connected to each other using all of the extension unit available profiles. For example, the main unit communication mode control section 325 controls so that the main unit 300 and the extension unit 400 are connected to each other using "SPP", "HFP", and "HID".

That is, if another device currently using the extension unit available profile is present, the main unit communication mode control section 325 transmits a disconnection request for disconnecting all of the other relevant devices to the main unit short-range wireless communication section 308 and then disconnects these other devices. Furthermore, the main unit communication mode control section 325 transmits a connection standby request to the main unit short-range wireless communication section 308. Here, the connection standby request demands to prepare for a connection request from the extension unit 400 with respect to all of the extension unit available profiles. Subsequently, the main unit 300 receives a connection request from the extension unit 400 to make a connection between the main unit 300 and the extension unit 400.

In addition, when the "priority mode" is not set in the main unit priority mode setting table 323, the main unit communication mode control section 325 generates a connection standby request for the available profile which is available.

The start-up process of the main unit communication mode control section 325 at the time of turning on the power of the main unit 300 will be described. The main unit communication mode control section 325 sends an inquiry to the main unit separation/combination detecting section 310 when the power is turned on to confirm whether the mobile communication terminal apparatus 200 is in the separated state. If the mobile communication terminal apparatus 200 is in the separated state, then the main unit communication mode control section 325 is in the separated state executes a process based on the communication mode of the main unit communication mode table 321. For example, if the communication mode is the extension unit available communication mode, the main unit communication mode control section 325 transmits a connection standby request for the available profile which is available to the main unit short-range wireless communication section 308. In addition, the main unit communication mode control section 325 transmits a connection standby request, which is prepared for a connection request from any of other devices with respect to any of extension unit available profiles other than one which is available, to the main unit short-range wireless communication section 308.

Furthermore, for example, if the communication mode is in the extension unit unavailable communication mode or the mobile communication terminal apparatus 200 is not in the separated state, the main unit communication mode control section 325 transmits a connection standby request, which is prepared for a connection request from any of other devices other than the extension unit 400, to the main unit short-range wireless communication section 308.

As described above, when short-range wireless communication with another device is terminated, or the connected state is changed, the main unit communication mode control section 325 updates the service class which can be supplied to the extension unit 400. Then, in response to the update of the service class, the main unit communication mode control section 325 updates the service class to be supplied to the extension unit 400 through short-range wireless communication with the extension unit 400. In other words, the main unit communication mode control section 325 employs the available profile which becomes available after the update to control the communication mode so that the main unit 300 and the extension unit 400 can be connected to each other.

The main unit communication mode control section 325 does not allow the main unit 300 to make a connection to the separated extension unit 400 through short-range wireless communication when a predetermined service class among the service classes managed by the main unit profile table 322 is unavailable. In addition, the main unit communication mode control section 325 terminates short-range wireless communication with another device using a service class managed by the main unit profile table 322 when the extension unit 300 is detached from the main unit during the priority mode. Then, the main unit communication mode control section 325 performs control to make a connection between the main unit 300 and the extension unit 400 through short-range wireless communication.

The main unit message output control section 326 outputs a message about the state of connection between the main unit 300 and the external unit 400 to the user. For example, the main unit message output control section 326 outputs such a message when there is a request of connection to another device or the mobile communication terminal apparatus 200 is in the separated state.

Figure 12:
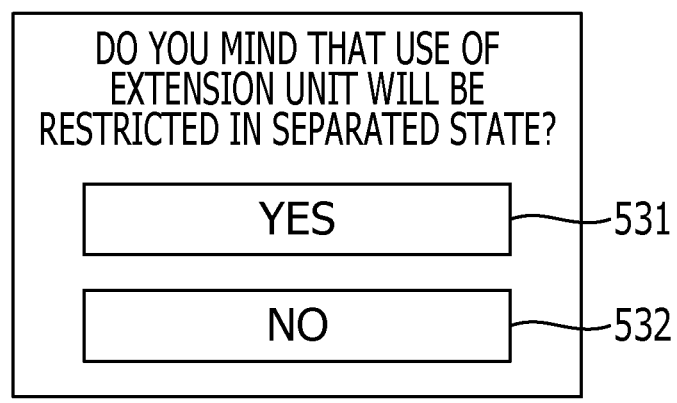
FIG. 12 is a diagram illustrating an example of a user interface where a message for the restricted use of the extension unit 400 in the separated state is output to the user.

Next, the case where a message is output when there is a request of connection to another device will be described. If there is a request of connection to another device using the extension unit available profile during the extension unit available communication mode, the main unit message output control section 326 outputs to the user a fact that the use of the extension unit 400 in the separated state is restricted. In other words, the main unit message output control section 326 outputs a message when there is a request of connection to another competitive device. Referring now to FIG. 12, an example of a user interface where a message for the restricted use of the extension unit 400 in the separated state is output to the user. FIG. 12 is a diagram illustrating an example of a user interface where a message for the restricted use of the extension unit 400 in the separated state is output to the user.

In FIG. 12, reference numeral 532 denotes a field for receiving the user's choice to accept the restriction and reference numeral 531 denotes a field for receiving the user's choice to reject the restriction. An example illustrated in FIG. 12 represents the fields for receiving from the user the results of the selection whether the restriction should be avoided in addition to the message for the restricted use of the extension unit 400 in the separated state. In the example illustrated in FIG. 12, if the selection of the field 531 is accepted on the selection screen, then the main unit 300 is connected to another device. On the other hand, if the selection of the field 532 is accepted on the selection screen, then the main unit 300 is not connected to another device.

In the example illustrated in FIG. 12, the interface for accepting the selection of the user is output before the connection between the main unit 300 and another device. Alternatively, the present invention is not limited to such a configuration. For example, the main unit message output control section 326 may display the available state of the extension unit 400 at the present moment using the main unit LED 306 without output of an interface in advance. In other words, the available state of the extension unit 400 may be displayed using the display of icons on the display of the main unit 300 or the lighting, blinking, or the like of the LED on the extension unit 400 without displaying the dialogue for accepting the user's selection in advance.

Output of a message about the separated state will be described. If the extension unit 400 is detached in spite of the "extension unit unavailable communication mode", the main unit message output control section 326 displays a warning message, such as "Power is turned off because the extension unit is unavailable", while sounding a warning beep or the like.

If the extension unit 400 is detached in spite of the "extension unit available communication mode", the main unit message output control section 326 refers to the main unit profile table 322. Then, if any functional restriction is found in the separation and use of the extension device 400, such a fact of the functional restriction is output. In other words, the main unit message output control section 326 reports the extension unit available profile which is in the unavailable state and managed by the main unit communication mode control section 325. If it is in the unavailable state for HID, for example, the main unit message output control section 326 displays a warning message, such as "Operation key pad is unavailable on the extension unit now", while sounding a warning beep or the like.

Furthermore, if there is a request to connect to another device, like the process for output of a message, the main unit message output control section 326 may employ the representation of icons on the display of the main unit 300 or the lighting, blinking, or the like of the LED on the extension unit 400. Here, the main unit message output control section 326 is also referred to as an "information section".

[Processing part of extension unit main/extension communication control section] The processing part of the extension unit main/extension communication control section 410 will be described. The extension unit reception control section 413 receives a notification message from the main unit 300 in the connected state. In the combined state, the extension unit reception control section 413 employs the extension unit wire communication section 408 to receive a notification message from the main unit 300 using the extension unit wire communication section 408. In the separated state, the extension unit reception control section 413 employs the extension unit short-range wireless communication section 407 to receive a notification message from the main unit 300.

The extension unit communication mode control section 414 updates the extension unit communication mode table 411 and the extension unit profile table 412 using the notification message received by the extension unit reception control section 413. That is, in the connected state, the extension unit communication mode control section 414 synchronizes the extension unit communication mode table 411 with the main unit communication mode table 321, and also synchronizes the extension unit profile table 412 with the main unit profile table 322.

The extension unit communication mode control section 414 performs a start-up process when the power of the extension unit 400 is turned on during the separated state. The start-up process performed by the extension unit communication mode control section 414 will be described. The extension unit communication mode control section 414 performs a process based on the communication mode of the extension unit communication mode table 411 when the power of the extension unit 400 is turned on.

For example, the extension unit communication mode control section 414 repeals the process of turning on the power of the extension unit 400 if the extension unit unavailable communication mode is employed. In other words, the extension unit power section 406 is controlled so that the power of the extension unit 400 is prevented from being turned on.

Furthermore, for example, if the extension unit available communication mode is employed, in order to transmit a connection request, which represents the demand of connection to the main unit 300, to the main unit 300 with respect to the extension unit available profile which is available, the extension unit communication mode control section 414 transmits this connection request to the extension unit short-range wireless communication section 407. In addition, with respect to the extension unit available profile which is available, the extension unit communication mode control section 414 transmits a request for starting a function restriction, which starts the restriction of a function corresponding to the extension unit available profile, to the extension unit I/O control section 405. Here, for example, the term "function corresponding to the extension unit available profile" is equal to the extension unit microphone 401 or the extension unit earpiece 402 as long as it is connected with HFP or equal to the extension unit operation key pad 403.

Next, the case where the extension unit profile table 412 stores SPP "1", HFP "1", and HID "0" will be described as another example. In this case, the extension unit communication mode control section 414 controls the extension unit short-range wireless communication section 407 to connect between the main unit 300 and the extension unit 400 through short-range wireless communication using SPP and HFP. In addition, the extension unit communication mode control section 414 controls the extension unit I/O control section 405 not to relay the data from extension unit operation key pad 403.

When the power is turned on, based on the fact that the information stored in each of the extension unit communication mode table 411 and the extension unit profile table 412 is not always newest, the main unit 300 may transmit a notification message to the extension unit 400 at the time of starting the extension unit 400. In this case, the extension unit communication mode control section 414 performs the start-up process after reflecting the notification message received from the main unit 300.

The extension unit separation/combination action control section 415 performs a process executed in the case where the extension unit 400 is detached from the main unit 300 and a process executed in the case where the extension unit 400 is combined with the main unit 300. Hereinafter, these processes will be described in order. The process executed in the case where the extension unit 400 is detached from the main unit 300 is equal to the start-up process carried out by the extension unit communication mode control section 414. Thus, the description of such a process will be omitted in the following description.

The process executed in the case where the extension unit 400 is detached from the main unit 300 by the extension unit separation/combination action control section 415 will be described. If the extension unit communication mode table 411 and the extension unit profile table 412 are updated, the extension unit separation/combination action control section 415 changes the state of connection between the main unit 300 and the extension unit 400 based on the contents of configuration after updating. If the communication mode of extension unit communication mode table 411 is updated from the extension unit available communication mode to the extension unit unavailable communication mode, for example, the extension unit separation/combination action control section 415 controls the extension unit power section 406 to turn off the power of the extension unit 400. In other words, the extension unit separation/combination action control section 415 transmits an instruction of power off to the extension unit power section 406. Thus, the extension unit power section 406 is allowed to turn off the extension unit 400.

Furthermore, description will be made for the case, for example, where the communication mode of the extension unit communication mode table 411 is the extension unit available communication mode and the available profile which can be used. The extension unit separation/combination action control section 415 controls the connection between the main unit 300 and the extension unit 400 using the available extension unit available profile which can be used after updating. In other words, for example, the extension unit separation/combination action control section 415 transmits a connection request for the extension unit available profile which can be used after updating to the extension unit short-range wireless communication section 407. As a result, the main unit 300 and the extension unit 400 are connected using the extension unit available profile which can be used after updating. Furthermore, if the available profile which can be used is updated, the extension unit separation/combination action control section 415 starts a function restriction or cancels the function restriction based on the extension unit available profile which can be used after updating.

Description will be made for the case, for example, the extension unit profile table 412 is updated from SPP "1", HFP "1", and HID "0" to SPP "1", HFP "0", and HID "1". In this case, before updating, the function corresponding to HID is restricted. Thus, the main unit 300 and the extension unit 400 are connected to each other using SPP and HFP. Here, if the updating is performed, the separation/combination action control section 415 makes connection between the main unit 300 and the extension unit 400 using SPP and HID. Then, the separation/combination action control section 415 starts restriction on the function corresponding to HFP while canceling the restriction on the function corresponding to HID.

The process carried out by the extension unit separation/combination action control section 415 at the time of combination will be described. The extension unit separation/combination action control section 415 cancels the function restriction, if the extension unit 400 is combined with the main unit 300. In other words, in the combined state, the main unit 300 and the extension unit 400 are wire connected to each other. As a result, the user can use the extension unit 400 without any function restriction even if there is an extension unit available profile.

Therefore, if the function restriction has been executed, then such function restriction is canceled.

Furthermore, the above example has been described with respect to the case where the extension unit 400 transmits a connection request to the main unit 300 in the separated state. However, the present invention is not limited to such a case. Alternatively, in the separated state, the main unit 300 may send a connection request to the extension unit 400 or both the main unit and the extension unit may send connection requests to each other.

Likewise, furthermore, the above example has been described with respect to the case where a disconnection request of disconnection in short-range wireless communication is sent from the extension unit 400. However, the present invention is not limited to such a case. Alternatively, the main unit 300 may send such a disconnection request or both the main unit 300 and the extension unit 400 may send disconnection requests to each other.

Figure 13:
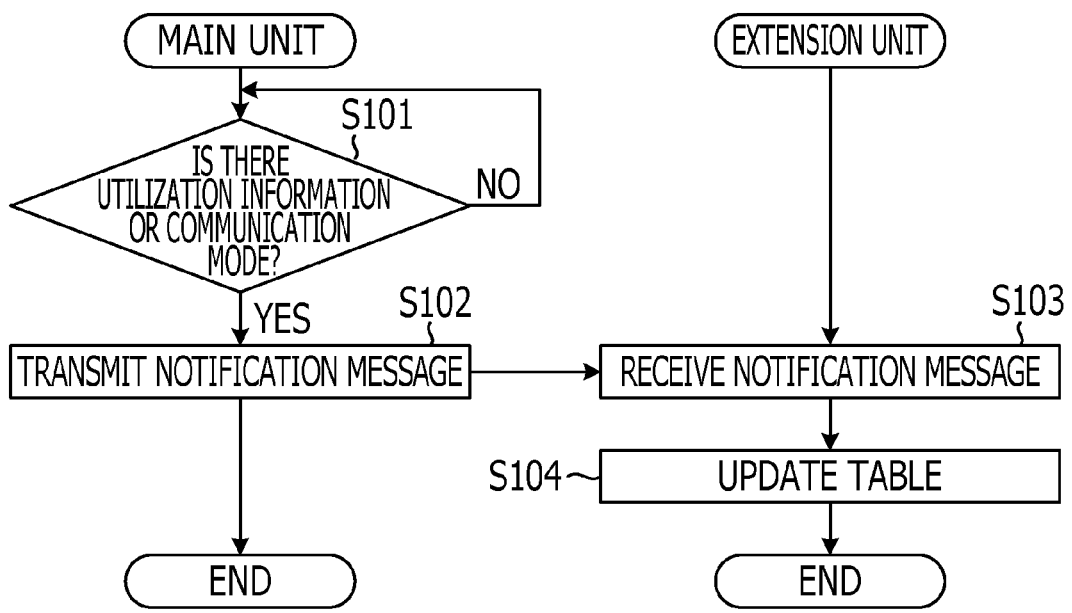
FIG. 13 is a sequence diagram illustrating an exemplary flow of the synchronization process carried out by the mobile communication terminal apparatus according to the second embodiment.

[Synchronization process] Next, an exemplary process flow carried out by the mobile communication terminal apparatus 200 according to the second embodiment will be described. First, an exemplary flow of a synchronization process carried out by the mobile communication terminal apparatus 200 according to the second embodiment will be described with reference to FIG. 13. FIG. 13 is a sequence diagram illustrating an exemplary flow of the synchronization process carried out by the mobile communication terminal apparatus according to the second embodiment. Here, a series of the steps illustrated in FIG. 13 is performed in the connected state.

As illustrated in FIG. 13, if there is a change in utilization information or communication mode (YES in step S101), the main unit notification control section 324 transmits a notification message for notifying the contents of the change to the extension unit 400 (step S102). In other words, if the main unit communication mode table 321 or the main unit profile table 322 is updated, the main unit notification control section 324 transmits a notification message for the utilization information or the communication mode after updating to the extension unit 400. For example, the main unit notification control section 324 transmits a notification message that includes the communication mode "1", SSP "1", HFP "1", and HID "1".

Subsequently, in the extension unit 400, the extension unit reception control section 413 receives the notification message (step S103). Then, the extension unit communication mode control section 414 updates the extension unit communication mode table 411 or the extension unit profile table 412 using the received notification message (step S104). In other words, for example, the extension unit communication mode control section 414 sets the communication mode "1" in the extension unit communication mode table 411 and sets SPP "1", HFP "1", and HID "1" in the extension unit profile table 412. Consequently, in the connected state, the extension unit communication mode control section 414 synchronizes the extension unit communication mode table 411 with the main unit communication mode table 321, and also synchronizes the extension unit profile table 412 with the main unit profile table 322.

Figure 14:
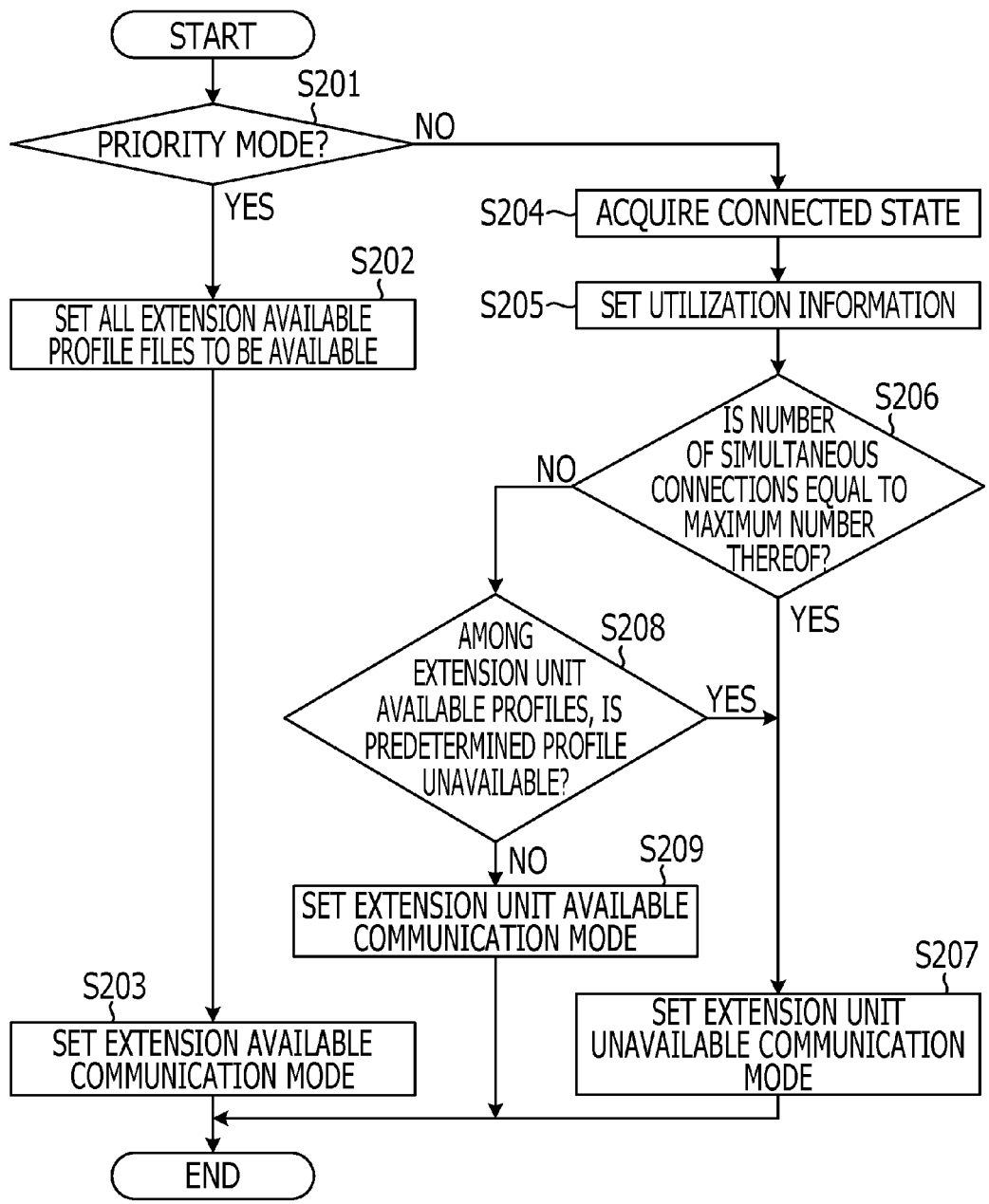
FIG. 14 is a flow chart that illustrates a table set-up process carried out by the main unit communication mode control section according to the second embodiment.

[Table set-up process] Referring to FIG. 14, the table set-up process carried out by the main unit communication mode control section 325 according to the second embodiment will be described. FIG. 14 is a flow chart that illustrates a table set-up process carried out by the main unit communication mode control section according to the second embodiment. Here, the table set-up process carried out by the main unit communication mode control section 325 corresponds to the process for setting the utilization information of the main unit profile table 322 and the process for setting the communication mode of the main unit communication mode table 321. Hereinafter, description will be made for the process for setting the utilization information and the process for setting the communication mode which will be executed as a series of processes. However, the present invention is not limited to such a configuration. For example, the process for setting the utilization information and the process for setting the communication mode may be independently performed as discrete processes. Here, a series of the aforementioned processes described with reference to FIG. 14 can be performed without relation to the state of connection.

As illustrated in FIG. 14, the main unit communication mode control section 325 determines whether the "priority mode" is set in the main unit priority mode setting table 323 (step S201). For example, the main unit communication mode control section 325 confirms whether the mode is set to the "priority mode" or the "non priority mode" with reference to the main unit priority mode setting table 323 to determine whether the mode is set to the "priority mode".

Here, if it is determined that the "priority mode" is being set up (YES in step S201), the main unit communication mode control section 325 sets up all of the extension unit available profiles (step S202). That is, the main unit communication mode control section 325 sets the utilization information "1" about all extension unit available profiles regardless of a the status of connection to another device.

Furthermore, the main unit communication mode control section 325 sets the "extension unit available communication mode" in the main unit communication mode table 321 (step S203). That is, the main unit communication mode control section 325 sets up a fact that the extension node 400 is available in the separated state.

On the other hand, if the main unit communication mode control section 325 determines that the "priority mode" is not set (NO in step S201), or in the case of the "non priority mode", the status of connection to another device is acquired from the main unit short-range wireless communication section 308 (step S204). Furthermore, the main unit communication mode control section 325 sets up the utilization information (step S205). For example, among the extension unit available profiles, the main unit communication mode control section 325 sets up the utilization information "0" for the profile which is being occupied by the connection to another device, while setting up the utilization information "1" in the profile which is not occupied by any device.

Furthermore, the main unit communication mode control section 325 determines whether the number of simultaneous connections reaches the maximum number of simultaneous connections (step S206). In other words, for example, when the maximum number of simultaneous connections is "2", it is determined whether it has already connected to two other devices. Here, if the main unit communication mode control section 325 determines that the number of simultaneous connections is equal to the maximum number of simultaneous connections (YES in step S206), then the main unit communication mode control section 325 sets the "extension unit unavailable communication mode" in the main unit communication mode table 321 (step S207). That is, the main unit communication mode control section 325 sets up that the extension unit 400 is unavailable in the separated state when the main unit 300 is connected to two other devices.

Furthermore, if the main unit communication mode control section 325 determines that the number of simultaneous connections is not the maximum number of simultaneous connections (NO in step S206), then the main unit communication mode control section 325 determines whether a predetermined profile among the extension unit available profiles is unavailable (step S208). That is, if the number of other devices connected to the main unit 300 is less than two, then the main unit communication mode control section 325 determines whether another additional device can be connected using the extension unit available profile. Furthermore, if the predetermined profile is not in the unavailable state (i.e. if the predetermined profile is in the available state) (NO in step S208), then the main unit communication mode control section 325 sets that the extension unit 400 is available in the separated state (step S209). On the other hand, if it is unavailable (i.e. if the predetermined profile is not in the available state) (Yes in step S208), then the main unit communication mode control section 325 sets the "extension unit unavailable communication mode" in the main unit communication mode table 321 (step S207).

Figure 15:
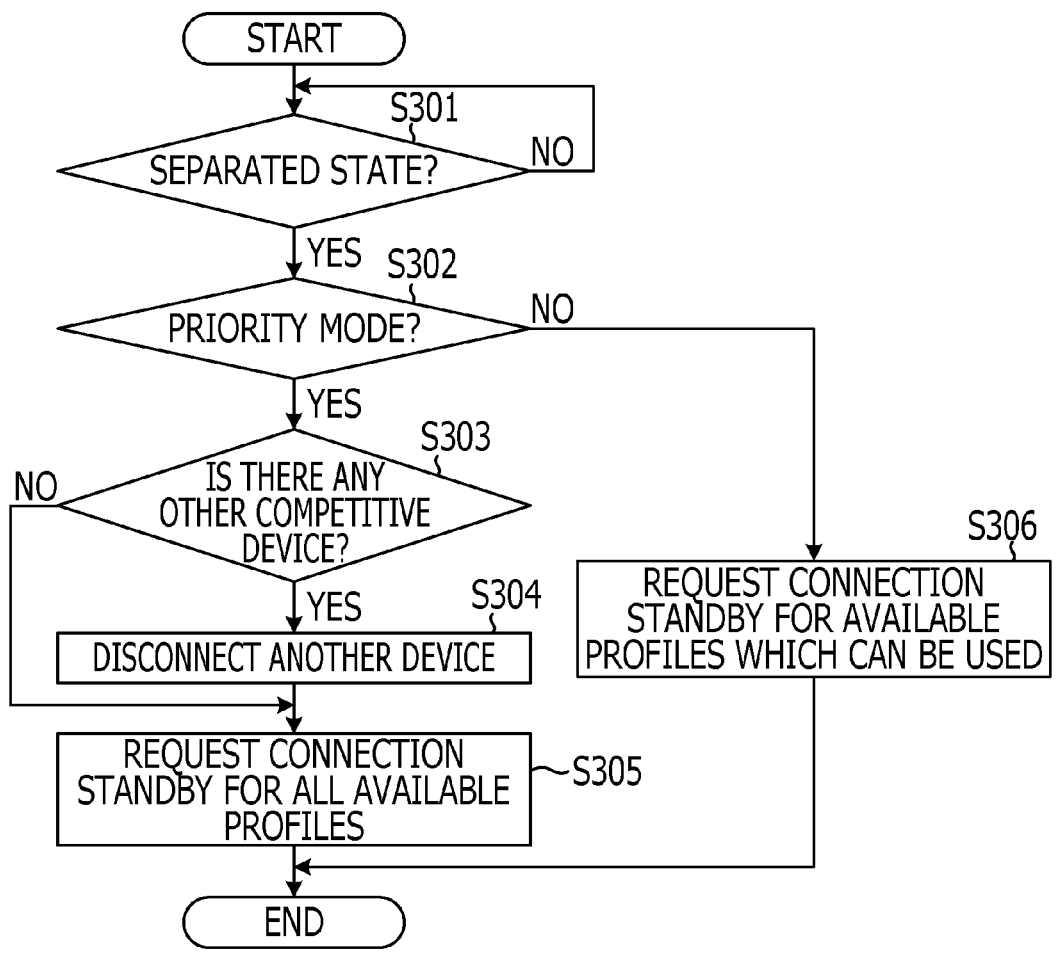
FIG. 15 is a flow chart illustrating a control process in the separated state carried out by the main unit communication mode control section according to the second embodiment.

[Control process in separated state] Referring now to FIG. 15, a control process in the separated state carried out by the main unit communication mode control section 325 according to the second embodiment will be described. FIG. 15 is a diagram illustrating a control process in the separated state carried out by the main unit communication mode control section 325 according to the second embodiment. Furthermore, a series of processes illustrated in FIG. 15 is carried out in the separated state.

As illustrated in FIG. 15, if it is in the separated state (YES in step S301), the main unit communication mode control section 325 determines whether the "priority mode" is set in the main unit priority mode setting table 323 (step S302). Here, the main unit communication mode control section 325 determines that the "priority mode" is set in the main unit priority mode setting table 323 (YES in step S302), then the main unit communication mode control section 325 determines whether there is another competitive device (step S303). In other words, the main unit communication mode control section 325 determines whether there is another device that competes with the extension unit 400 for the profile intended to be used. Then, if the main unit communication mode control section 325 determines that there is another competitive device (YES in step S303), then the main unit communication mode control section 325 releases the connection between the another competitive device and the main unit 300 (step S304). Subsequently, the main unit communication mode control section 325 generates a connection standby request for all of the extension unit available profiles (Step S305). In other words, the main unit communication mode control section 325 controls so that the main unit 300 and the extension unit 400 can be connected to each other using all of the extension unit available profiles. Furthermore, if the main unit communication mode control section 325 determines that there is no competitive device (NO in step S303), then the connection standby request is generated for all of the extension unit available profiles (step S305).

On the other hand, if the main unit communication mode control section 325 determines that the "priority mode" is not set in the main unit priority mode setting table 323 (NO in step S302), then a connection standby request is generated for the available profile which is being available (Step S306).

Figure 16:
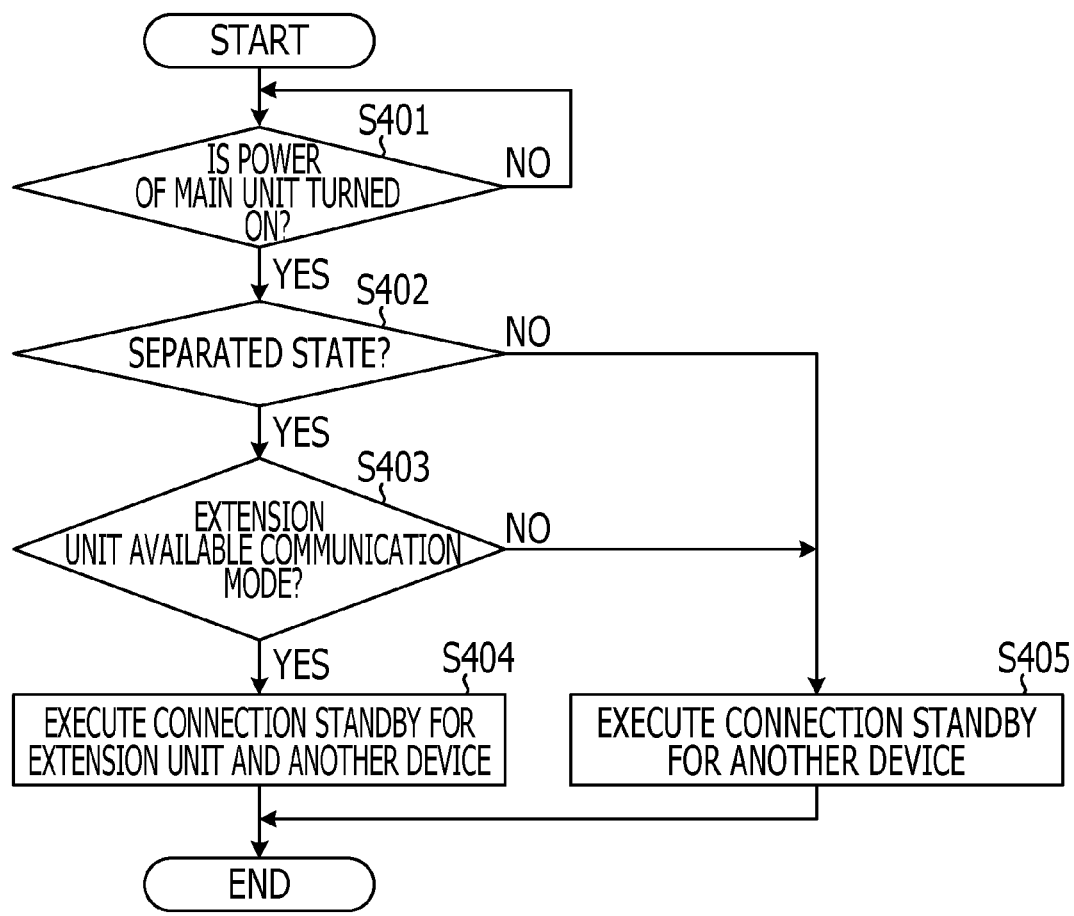
FIG. 16 is a flow chart illustrating the start-up process when starting the main unit by the main unit communication mode control section according to the second embodiment.

[Start-up process for main unit] The start-up process when starting the main unit 300 by the main unit communication mode control section 325 according to the second embodiment will be described with reference to FIG. 16. FIG. 16 is a flow chart illustrating the start-up process when starting the main unit 300 by the main unit communication mode control section 325 according to the second embodiment.

As shown in FIG. 16, if the power of the main unit 300 is turned on (YES in step S401), then the main unit communication mode control section 325 determines whether the main unit 300 is in the separated state (step S402). If the main unit communication mode control section 325 determines that the main unit 300 is in the separated state (YES in step S402), then the main unit communication mode control section 325 determines whether the communication mode is the "extension available communication mode" (step S403).

Here, if the main unit communication mode control section 325 determines that the communication mode is the "extension unit available communication mode" (YES in step S403), then a connection standby request, which is prepared for a connection request from the extension unit 400 or another device is sent to the main unit short-range wireless communication section 308 (step S404). For example, for the available profile which is being available, the main unit communication mode control section 325 transmits a connection standby request, which is prepared for a connection request from the extension unit 400, to the main unit short-range wireless communication section 308. In addition, for any of other profiles, the main unit communication mode control section 325 transmits a connection standby request, which is prepared for a connection request from another device, to the main unit short-range wireless communication section 308.

On the other hand, if the main unit communication mode control section 325 determines that the main unit 300 is not separated from the extension unit 400 (NO in step S402), the main unit communication mode control section 325 transmits a connection standby request, which is prepared for a connection request from any device other than the extension unit, to the main unit short-range wireless communication section 308 (step S405). Likewise, even if the main unit communication mode control section 325 determines that the communication mode is the extension unit unavailable communication mode (NO in step S403), the main unit communication mode control section 325 transmits a connection standby request, which is prepared for a connection request from any device other than the extension unit, to the main unit short-range wireless communication section 308 (step S405).

Figure 17:
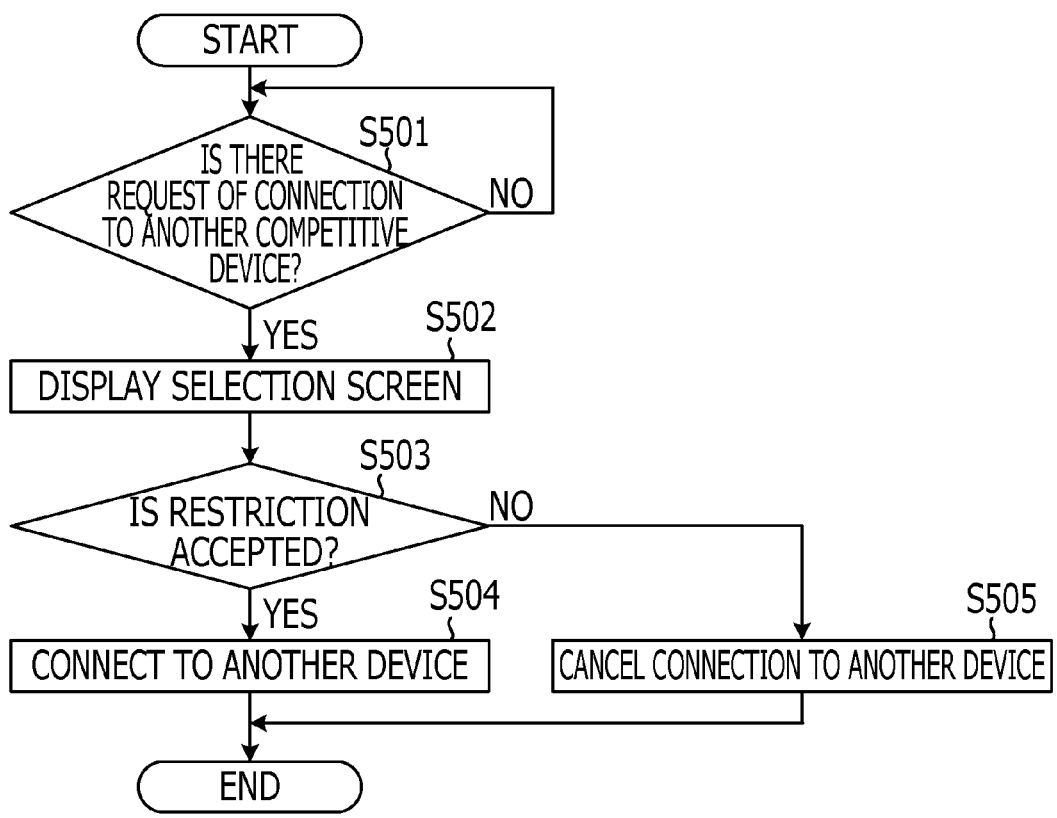
FIG. 17 is a flow chart that illustrates an example of the message output process carried out by the main unit message output control section according to the second embodiment.

[Message output process] Referring now to FIG. 17, an example of the message output process carried out by the main unit message output control section 326 according to the second embodiment will be described. FIG. 17 is a flow chart that illustrates an example of the message output process carried out by the main unit message output control section 326 according to the second embodiment. Hereinafter, description will be made for the case where a message is output when there is a request of connection to another device. Furthermore, a series of processes illustrated in FIG. 17 is carried out in the separated state or combined state.

As illustrated in FIG. 17, if there is a request of connection to any of other competitive devices (YES in step S501), then the main unit message output control section 326 displays a selection screen as illustrated in FIG. 12 (step S502). In other words, for example, the main unit message output control section 326 outputs to the user a message that the use of the extension unit 400 in the separated state is restricted, while displaying a field for receiving from the user a selected result of whether the restriction is accepted.

After that, if the main unit message output control section 326 receives the selection of the field where the user accepts the restriction on the selection screen (YES in step S503), then the main unit 300 and another device are connected to each other (step S504). On the other hand, if the main unit message output control section 326 receives the selection of the field where the user does not accept the restriction on the selection screen (NO in step S503), then the main unit 300 and another device are not connected to each other (step S505).

Figure 18:
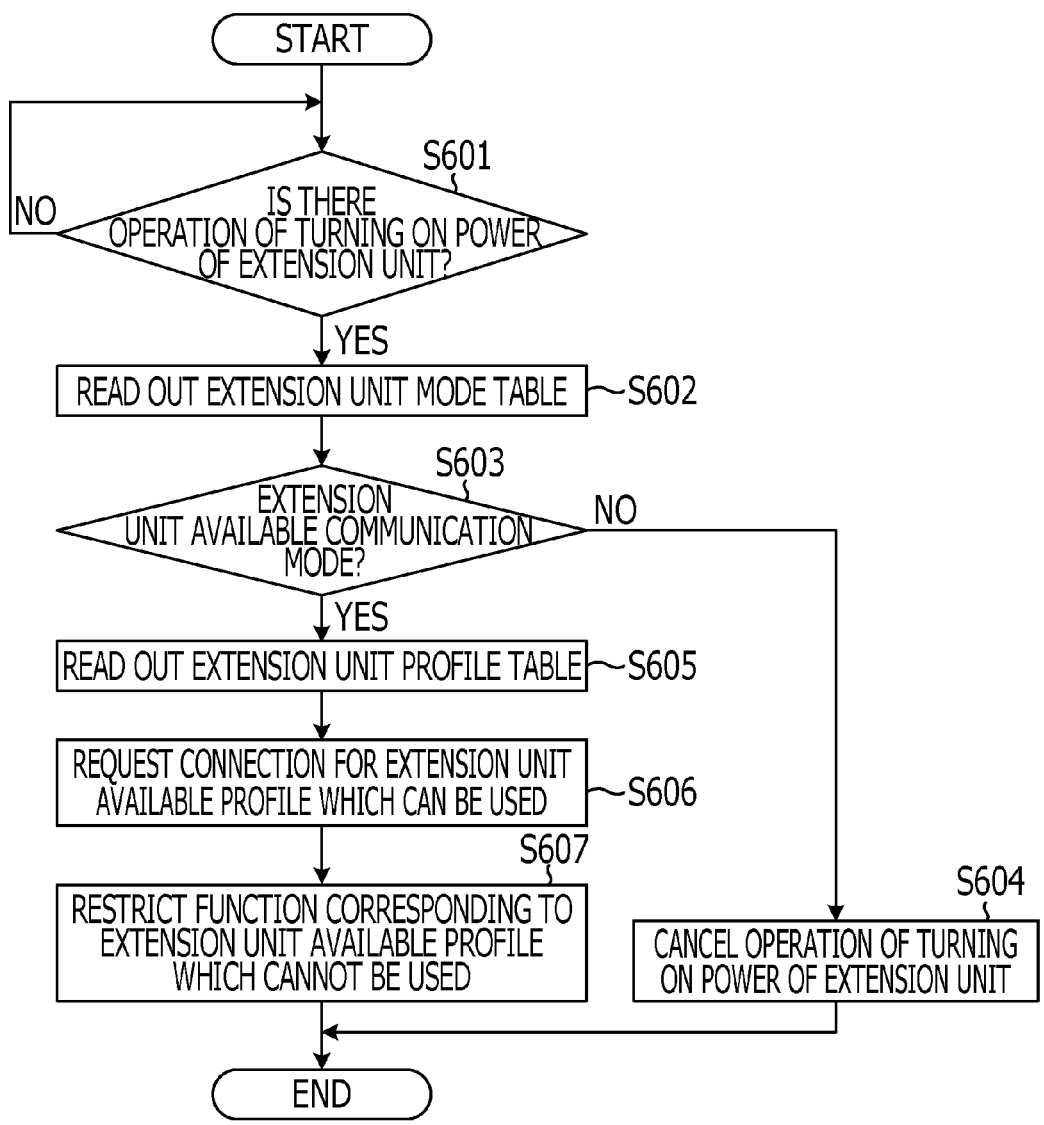
FIG. 18 is a flow chart illustrating an example of the start-up process carried out by the extension unit reception control section in the separated state according to the second embodiment.

[Start-up process for extension unit] Referring now to FIG. 18, an example of the start-up process carried out by the extension unit communication mode control section 414 in the separated state according to the second embodiment will be described. FIG. 18 is a flow chart illustrating the example of the start-up process carried out by the extension unit communication mode control section 414 in the separated state according to the second embodiment.

As illustrated in FIG. 18, if the power of the extension unit 400 is turned on (YES in step S601), then the extension unit communication mode control section 414 reads out the extension unit communication mode table 411 (step S602). Then, the extension unit communication mode control section 414 determines whether the communication mode of the extension unit communication mode table 411 is the "extension unit available communication mode" (step S603). Here, if the extension unit communication mode control section 414 determines that the communication mode is the "extension unit unavailable communication mode" (NO in step S603), then the extension unit communication mode control section 414 cancels the operation of turning on the power of the extension unit 400 (step S604). In other words, the extension unit communication mode control section 414 controls the extension unit power section 406 to the power of the extension unit 400 from being turned on.

On the other hand, if the extension unit communication mode control section 414 determines that the communication mode is the "extension unit available communication mode" (YES in step S603), then the extension unit communication mode control section 414 reads out the extension unit profile table 412 (step S605). Subsequently, for the extension unit available profile which is being available, the extension unit communication mode control section 414 transmits the extension unit profile table 412 to the extension unit short-range wireless communication section 407 from which a request of connection to the main unit 300 is transmitted to the main unit 300 (step S606).

Next, the case where the extension unit profile table 412 stores SPP "1", HFP "1", and HID "0" will be described as another example. In this case, the extension unit communication mode control section 414 controls the extension unit short-range wireless communication section 407 to make a connect between the main unit 300 and the extension unit 400 using SPP and HFP through short-range wireless communication.

In addition, the extension unit communication mode control section 414 transmits a request of starting the restriction of a function corresponding to the extension unit available profile which cannot be used to the extension unit I/O control section 405 (step S607).

For example, the extension unit communication mode control section 414 controls the extension unit I/O control section 405 not to relay the data from the extension unit operation key pad 403.

Figure 19:
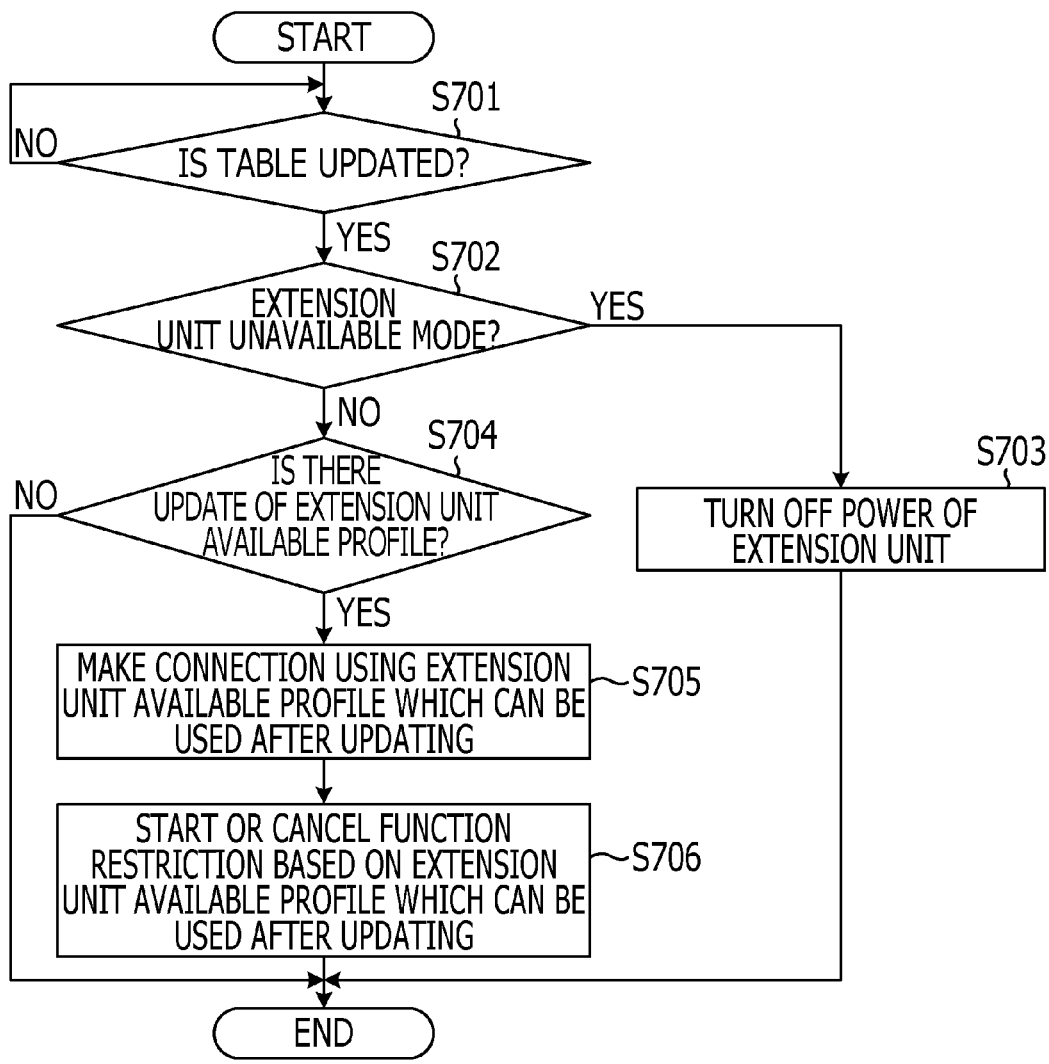
FIG. 19 is a flow chart of an example of the process carried out by the extension unit separation/combination action control section in the separated state according to the second embodiment.

[Process for extension unit in separated state] Referring now to FIG. 19, a control process in the separated state carried out by the extension unit communication mode control section 415 according to the second embodiment will be described. FIG. 19 is a flow chart of an example of the process carried out by the extension unit separation/combination action control section 415 in the separated state according to the second embodiment. The series of the aforementioned processes illustrated in FIG. 19 can be executed every time the table is updated in the step S104 of FIG. 13 in the separated state.

As shown in FIG. 19, if the extension unit communication mode table 411 or the extension unit profile table 412 is updated (YES in step S701), then the extension unit separation/combination action control section 415 determines whether the communication mode is the "extension unit unavailable communication mode" (step S702). In other words, the extension unit separation/combination action control section 415 determines whether the communication mode of the extension unit communication mode table 411 is the "extension unit unavailable communication mode".

Furthermore, if the extension unit separation/combination action control section 415 determines that the communication mode is the extension unit unavailable communication mode (YES in step S702), the extension unit power section 406 is controlled to turn off the power of the extension unit 400 (step S703). That is, for example, extension unit separation/combination action control section 415 will turn off extension unit 400, if the communication mode of extension unit communication mode table 411 is updated from an extension unit available communication mode to an extension unit unavailable communication mode.

On the other hand, if the extension unit separation/combination action control section 415 determines that the communication mode is the extension unit unavailable communication mode (NO in step S702), then the extension unit separation/combination action control determines whether the extension unit available profile which can be used is updated (step S704). In other words, if the extension unit separation/combination action control section 415 determines that the communication mode is the "extension unit available communication mode", the extension unit separation/combination action control section 415 determines whether the extension unit available profile is updated.

Here, if the extension unit separation/combination action control section 415 determines that there is no update (NO in step S794), then it directly completes the process. On the other hand, the extension unit separation/combination action control section 415 determines that there is an update (YES in step S704), then the extension unit separation/combination action control section 415 controls so that the main unit 300 and the extension unit 400 can be connected to each other (step S705). Description will be made for the case, for example, the extension unit profile table 412 is updated from SPP "1" HFP "1", and HID "0" to SPP "1", HFP "0", and HID "1". In this case, the extension unit separation/combination action control section 415 controls the extension unit short-range wireless communication section 407 to make a connect between the main unit 300 and the extension unit 400 using SPP and HFP.

Furthermore, based on extension unit available profile which can be used after updating, the separation/combination action control section 415 starts the function restriction and cancels the function restriction (step S706). For example, the extension unit separation/combination action control section 415 cancels a restriction on the function corresponding to HID, while starting a restriction on the function corresponding to HFP.

[Effects of second embodiment] As described above, according to the second embodiment, the mobile communication terminal apparatus 200 manages whether a plurality of service classes offered when performing short-range wireless communication with the extension unit 400 is in the state where the extension unit 400 can utilize these service classes. The mobile communication terminal apparatus 200 controls short-range wireless communication between the main unit 300 and the extension unit 400 in the separated state on the basis of the available state of a plurality of service classes being managed. Consequently, if there is free service class for short-range wireless communication when the extension unit 400 is detached from the main unit 300 under the state in which the main unit 300 performs short-range wireless communication with another device, the extension unit 400 can be used using short-range wireless communication. Thus, an increase in user's operability can be attained.

In addition, according to the second embodiment, the mobile communication terminal apparatus 200 updates the available state of a plurality of service classes when short-range wireless communication with another device is completed. Furthermore, the mobile communication terminal apparatus 200 updates the service class to be supplied to the extension unit 400 in response to the update of the available state. As a result, the connection between the main unit 300 and another device can be seamlessly switched to the connection between the extension unit 400 and the main unit 300 and vice versa.

According to the second embodiment, the mobile communication terminal apparatus 200 does not establish the short-range wireless communication between the main unit 300 and the extension units 400 in the separated state when a predetermined service class among a plurality of service classes is unavailable. As a result, if the extension unit 400 is separated and the extension unit 400 cannot be connected to the main unit 300 through short-range wireless communication, it is possible to reduce the consumption of electric power because of no connection.

According to the second embodiment, if the mobile communication terminal apparatus 200 allows the extension unit 400 to be detached from the main unit 300 while the short-range wireless communication between the main unit 300 and another device is being established, the short-range wireless communication between the main unit 300 and another device is cancelled to newly establish the short-range wireless communication between the main unit 300 and the extension unit 400. Therefore, even if the extension unit available profile is occupied by another device, the user is able to make a connection between the main unit 300 and the extension unit 400 without executing the operation of breaking the connection to another device, or the like.

In other words, for example, when the main unit 300 is connected to a car navigation system or a keyboard through short-range wireless communication, the main unit 300 cannot be connected to the extension unit 400 through short-range wireless communication even if the extension unit 400 is detached from the main unit 300. In this case, it is thought that the conventional technology may allow the user to disconnect the navigation system and the keyboard from the main unit 300 and then make a connection between the main unit 300 and the extension unit 400. In contrast, according to the second embodiment, the main unit 300 completes the short-range wireless communication with another device using the extension unit available profile and then makes a connection between the main unit 300 and the extension unit 400, resulting in an increase in user's operability.

Furthermore, the user may be unable to make a connection between the extension unit 400 and the main unit 300 through short-range wireless communication when the extension unit 400 is detached from the main unit 300. In this case, in the conventional technology, the user specifies a cause of impossibility in connection between the main unit and the extension unit through short-range wireless communication and then eliminates the specified cause. The case where the user cannot connect the extension unit and the main unit is, for example, one in which the number of simultaneous connections is equal to the maximum number of simultaneous connections when the extension unit available profile is used by another device. Here, if it is not the user having knowledge about the specification of the mobile terminal and the short-range wireless communication, it may be difficult to specify the cause. In contrast, the mobile communication terminal apparatus 200 manages the extension unit available profiles to control the connection between the main unit 300 and the extension unit 400. Thus, even if the user does not have knowledge about the specification of the mobile terminal and the short-range wireless communication, the user can easily handle the extension unit available profiles. Therefore, an increase in user's possibility can be attained.

According to the second embodiment, the mobile communication terminal apparatus 200 reports the service classes in the unavailable state. As a result, the user can easily grasp which function can be used among the functions of the extension unit 400.

Third Embodiment

The embodiments have been described. Alternatively, any of other embodiments and examples thereof may be carried out. Hereinafter, another embodiment will be described.

[Extension unit unavailable communication mode] In the aforementioned embodiments, the examples of the extension unit unavailable communication mode have been described so that the number of simultaneous connections is equal to the maximum number thereof and the extension unit available profiles are unavailable. However, the present invention is not limited to these examples, any of other factors may be considered. For example, the extension unit unavailable communication mode may be used when the extension unit 400 is detached from the main unit 300 in the state where the user performs the operation of restricting the function of the mobile communication terminal apparatus 200. Alternatively, the extension unit unavailable communication mode may be used when the connection is unavailable because of any of other competitive functions.

[Main unit] Furthermore, for example, the aforementioned embodiments have been described using examples in which the main unit 300 communicates with the base station. However, the present invention is not limited to any of these embodiments. Alternatively, for example, the extension unit 400 may communicate with a base station or both the main unit 300 and the extension unit 400 may not communicate with a base station. In this case, the mobile communication terminal apparatus corresponds to an information terminal without a function of communication with a base station.

[System configuration] Among the processes described in the aforementioned embodiments, part or all of the processes described as those automatically carried out may be manually executed. Alternatively, part or all of the processes described as those manually carried out may be automatically executed. Furthermore, processing procedures, control procedures, specific names, information including various kinds of data and parameters (FIG. 1 to FIG. 9), and so on, which has been described in the above description, the drawings, or the like may be arbitrarily changed if not otherwise specified.

Furthermore, each of the structural components of the respective devices shown in the drawings is represented as a functional conceptual constituent, so that it will be not necessarily constructed in a physical form as shown in the drawings. That is, the concrete forms of distribution/integration of each device is not restricted to one illustrated in any of the drawings. All or part of the device may be configured by functional or physical distribution/integration in arbitrary unit depending on various kinds of loads, usage circumstances, and so on.

For example, the main unit 300 may have an operation key pad and the extension unit 400 may have a speaker.

[Computer] Furthermore, various kinds of the processes described in the aforementioned embodiments can be realized by execution on previously prepared programs on a computer, such as a personal computer or a work station. Hereinafter, an example of the computer that executes a method for controlling short-range wireless communication and has the same functions as those described in the aforementioned embodiments will be described with reference to FIG. 20. Here, FIG. 20 is a diagram illustrating an example of the computer that executes a method for controlling short-range wireless communication according to the second embodiment.

Figure 20:
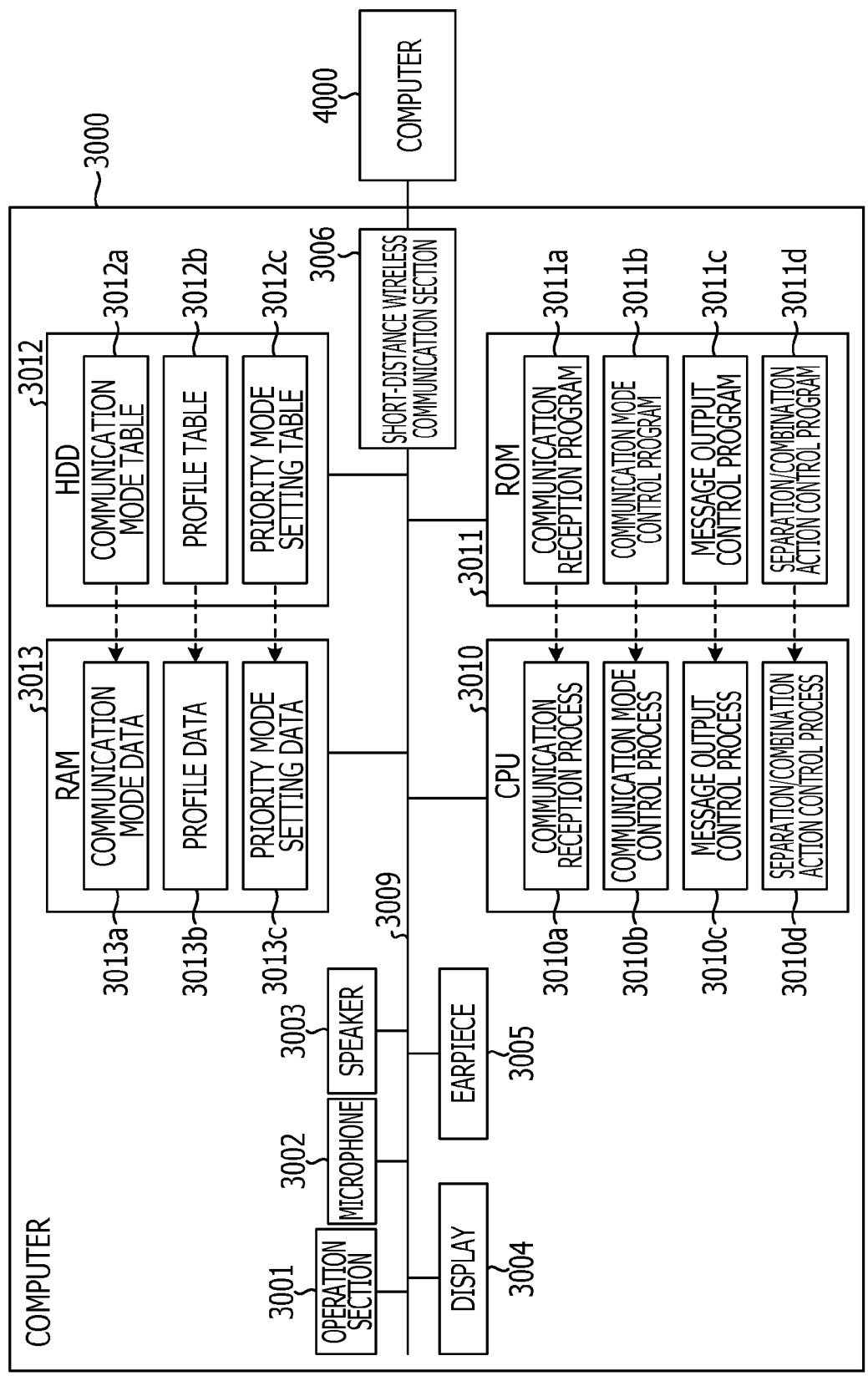
FIG. 20 is a diagram illustrating an example of the computer that executes a method for controlling short-range wireless communication according to the second embodiment.

As illustrated in FIG. 20, a computer 3000 according to the second embodiment includes an operation section 3001, a microphone 3002, a speaker 3003, a display 3004, and a short-range wireless communication section 3006. In addition, the computer 3000 includes a CPU 3010, a ROM 3011, a hard disk drive (HDD) 3012, and a random access memory (RAM) 3013. In the computer 3000, furthermore, the sections and parts are connected to one another through a bus 3009 and so on, respectively. Furthermore, the computer 3000 is connected to another computer 4000 through short-range wireless communication.

The ROM 3011 includes control programs that exert the same functions as those of the main unit main/extension communication control section 320 and the extension unit main/extension communication control section 410 which were described in the second embodiment. For example, as shown in FIG. 20, the ROM 3011 includes a notification reception program 3011*a* having the same functions as those of the main unit notification control section 324 and the extension reception control section 413. In addition, the ROM 3011 includes a communication mode control program 3011*b* having the same functions as those of the main unit communication mode control section 325 and the extension unit communication mode control section 414. The ROM 3001 also includes a message output control program 3011*c* having the same functions as those of the main unit message output control section 326. The ROM 3001 further includes a separation/combination action control program 3011*d* that exerts the same functions as those of the extension unit separation/ combination action control section 415. Here, as with the respective structural components of the mobile communication terminal apparatus 200 illustrated in FIG. 2 to FIG. 4, these programs 3011a to 3011d may be suitably unified or separated.

Furthermore, the CPU 3010 reads out these programs 3011a to 3011d from the ROM 3011 and then executes them.

As a result, as illustrated in FIG. 20, these programs 3011a to 3011d function as the notification reception process 3010a, the communication mode control process 3010b, the message output control process 3010c, and the separation/combination action control process 3010d, respectively. The processes 3010a to 3010b correspond to the main unit notification control section 324, the extension unit reception control section 413, the main unit communication mode control section 325, and the extension unit communication mode control section 414, which are illustrated in FIG. 3 and FIG. 4, respectively. Furthermore, the processes 3010c to 3010d correspond to the main unit message output control section 326 and the extension unit separation/combination action control section 415, respectively.

Furthermore, the HDD 3012 includes a communication mode table 3012a, a profile table 3012b, and a priority mode table 3012c. The tables 3012a to 3012c correspond to the main unit communication mode table 321, the main unit profile table 322, the extension unit communication mode table 411, the extension unit profile table 412, and the main unit priority mode setting table 323, respectively.

Furthermore, the CPU 3010 reads out a communication mode table 3012a, a profile table 3012b, and a priority mode table 3012c, and then stores them in the RAM 3013. Furthermore, the CPU 3010 executes a program for controlling the mobile communication terminal apparatus using the communication mode data 3013a, the profile data 3013b, and the priority mode data 3013c.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

What is claimed is:

1. A mobile communication terminal apparatus comprising:
a mobile communication terminal main body; and
an extension unit detachable from the mobile communication terminal main body and capable of performing short-range wireless communication with the mobile communication terminal main body when being detached in a separated state from the mobile communication terminal main body, wherein
the mobile communication terminal main body includes:
a first memory that manages profile information of whether a plurality of service classes are available for performing short-range wireless communication with the extension unit; and
a first processor that controls short-range wireless communication with the extension unit in the separated state on the basis of the availability of each of the plurality of service classes provided by the profile information managed by the first memory.

2. The mobile communication terminal apparatus according to claim 1, wherein
the first memory updates the profile information of at least one of the plurality of service classes when short-range wireless communication with another device is completed, and
the first processor updates a service class to be supplied to the extension unit in response to the update of the profile information of at least one of the plurality of service classes by the first memory.

3. The mobile communication terminal apparatus according to claim 1, wherein
the first processor prohibits short-range wireless communication with the extension unit in the separated state using a predetermined service class among the plurality of service classes managed by the first memory when the predetermined service class is unavailable.

4. The mobile communication terminal apparatus according to claim 1, wherein
the first processor establishes short-range wireless communication with the extension unit by stopping an established short-range wireless communication with another device when the extension unit is detached into the separated state.

5. The mobile communication terminal apparatus according to claim 1, further comprising:
an information section that informs a user that a service class is unavailable based on the profile information which is managed by the first memory.

6. A computer-readable medium storing a program in a mobile communication terminal apparatus that includes a first housing and a second housing that are detachable and performs short-range wireless communication when the first housing and the second housing are detached in a separated state, the program when executed instructs the mobile communication terminal apparatus to perform the processes of:
managing profile information of whether a plurality of service classes are available for performing short-range wireless communication between the first housing and second housing; and
controlling short-range wireless communication with the first and second housing in the separated state on the basis of the availability of each of the plurality of service classes provided by the managed profile information.

7. The mobile communication terminal apparatus according to claim 1, wherein the plurality of service classes include at least two of a first service class for communication of control signals, a second service class for communication of audio signals, and a third service class for communication of operating information of an input device.

8. The mobile communication terminal apparatus according to claim 1, wherein the first processor switches different procedures in accordance with "priority mode" or "non priority mode".

9. The mobile communication terminal apparatus according to claim 1, wherein in a start-up process for the mobile communication terminal main body, the first processor switches different procedures in accordance with "SEPARATED STATE?" and "EXTENSION UNIT AVAILABLE COMMUNICATION MODE?".

10. The mobile communication terminal apparatus according to claim 1, wherein in a start-up process for the extension unit, a second processor, included in the extension unit, switches different procedures in accordance with "EXTENSION UNIT AVAILABLE COMMUNICATION MODE?".

11. The mobile communication terminal apparatus according to claim 1, wherein in a process for the extension unit in the separated state, a second processor, included in the extension unit, switches different procedures in accordance with "EXTENSION UNIT UNAVAILABLE MODE?".

* * * * *